US006819777B2

(12) United States Patent
Baker et al.

(10) Patent No.: US 6,819,777 B2
(45) Date of Patent: Nov. 16, 2004

(54) MAIL PROCESSING SYSTEMS AND METHODS

(75) Inventors: Christopher A. Baker, Lafayette, IN (US); Alexander Moon, West Lafayette, IN (US); Peter N. Baker, Lafayette, IN (US); Jennifer Wolverton, Lafayette, IN (US)

(73) Assignee: Mailcode Inc., Indianapolis, IN (US)

( * ) Notice: Subject to any disclaimer, the term of this patent is extended or adjusted under 35 U.S.C. 154(b) by 0 days.

(21) Appl. No.: 10/395,775

(22) Filed: Mar. 24, 2003

(65) Prior Publication Data

US 2003/0179906 A1 Sep. 25, 2003

Related U.S. Application Data

(63) Continuation of application No. 09/405,599, filed on Sep. 24, 1999, now Pat. No. 6,539,098.

(51) Int. Cl.[7] .................................................. G06K 9/00
(52) U.S. Cl. ...................................... 382/101; 209/584
(58) Field of Search ................................ 382/101, 102; 345/956, 961, 978; 704/200; 209/584, 900

(56) References Cited

U.S. PATENT DOCUMENTS

| 4,509,635 | A | | 4/1985 | Emsley et al. |
| 4,556,944 | A | | 12/1985 | Daniels et al. |
| 4,569,026 | A | * | 2/1986 | Best .......................... 345/716 |
| 4,632,252 | A | | 12/1986 | Haruki et al. |
| 4,908,864 | A | | 3/1990 | Togawa et al. |
| 4,921,107 | A | | 5/1990 | Hofer |
| 4,992,649 | A | | 2/1991 | Mampe et al. |
| 5,031,223 | A | * | 7/1991 | Rosenbaum et al. ........ 382/101 |
| 5,042,667 | A | | 8/1991 | Keough |
| 5,212,730 | A | | 5/1993 | Wheatley et al. |
| 5,263,118 | A | | 11/1993 | Cornelison |
| 5,303,388 | A | * | 4/1994 | Kreitman et al. ........... 345/836 |
| 5,305,244 | A | | 4/1994 | Newman et al. |

(List continued on next page.)

FOREIGN PATENT DOCUMENTS

| DE | WO 99/16559 | * | 4/1999 | ............. B07C/3/20 |
| FR | 2591512 | | of 1987 | |
| FR | 2591512 | * | 12/1987 | ............ G06K/9/00 |
| JP | 08243507 | * | 9/1996 | ............ G06K/9/00 |
| JP | 08-10243507 A | | 9/1996 | |
| JP | 1034089 | * | 2/1998 | ............. B07C/7/04 |
| JP | 10034089 | | 2/1998 | |
| WO | 99/16559 | | 4/1999 | |

OTHER PUBLICATIONS

*Mail Technology —Tomorrow's World, Business Opportunities and Solutions in a Global Market*, International Conference, Jun. 23–24, 1999.

*Primary Examiner*—Mehrdad Dastouri
(74) *Attorney, Agent, or Firm*—Christopher J. Capelli; Charles R. Malandra, Jr.; Angelo N. Chaclas

(57) ABSTRACT

A mail sorter (22) includes an imaging device (60) to generate a plurality of images each corresponding to one of the plurality of mail pieces (36). The mail sorter (22) performs a character recognition routine on each of the images to sort a number of the mail pieces (36) and identify one of the mail pieces as being unsortable by the routine. An operator input processing subsystem (24) includes a number of stations (74). These stations (74) each include a display and a voice input device. The subsystem (24) responds to the mail sorter (22) to route the images to the stations (74). One of the stations (74) is operable to display one of the images on its corresponding display device and receive vocal input from an operator with its corresponding voice input device in response to viewing the image. The subsystem (24) executes a voice recognition routine to determine address information from the vocal input and provides this information to the mail sorter (22) to sort a corresponding one of the mail pieces (36).

4 Claims, 17 Drawing Sheets

U.S. PATENT DOCUMENTS

| | | | |
|---|---|---|---|
| 5,359,712 A | * 10/1994 | Cohen et al. | 345/723 |
| 5,538,138 A | 7/1996 | Reich | |
| 5,557,512 A | 9/1996 | Vanko et al. | |
| 5,558,232 A | 9/1996 | Stevens et al. | |
| 5,574,798 A | * 11/1996 | Greer et al. | 382/100 |
| 5,640,320 A | 6/1997 | Jackson et al. | |
| 5,677,834 A | 10/1997 | Mooneyham | |
| 5,697,504 A | 12/1997 | Hiramatsu et al. | |
| 5,729,600 A | 3/1998 | Blaha et al. | |
| 5,734,568 A | 3/1998 | Borgendale et al. | |
| 5,768,416 A | 6/1998 | Lech et al. | |
| 5,790,429 A | 8/1998 | Baker et al. | |
| 5,794,789 A | * 8/1998 | Payson et al. | 209/549 |
| 5,862,243 A | 1/1999 | Baker et al. | |

* cited by examiner

MAIL PROCESSING SYSTEMS AND METHODS

This is a continuation application of application Ser. No. 09/405,599, filed on Sep. 24, 1999, now U.S Pat. No. 6,539,098.

BACKGROUND OF THE INVENTION

The present invention relates to mail processing techniques, and more particularly, but not exclusively, relates to sorting mail based on vocal input of address information.

Today's mail may often be processed with automated optical character reading procedures. As a result, manual entry of address data may frequently be avoided. However, on occasion, some mail pieces, such as those with handwritten, incomplete, or improperly arranged addresses, cannot be completely processed using an automated procedure. Also, automated processing can be particularly troublesome for brochures, catalogs, and other mail that bears a significant amount of non-address writing or graphics. In these instances, an operator typically types in address data with a keyboard.

Depending on the capabilities of the automated equipment and the mail piece address quality, multiple operators may be desired to maintain a given mail processing speed. Moreover, because mail handling equipment may be noisy and visually distracting, it is sometimes desirable to remotely locate operators relative to such equipment. Even so, limits on an operator's ability to rapidly, yet accurately key-in address data remains. In fact, the availability of labor with high-speed typing skills in general can impose a limit on the effectiveness of mail processing systems.

Thus, there is a demand for advancements in mail processing technology to address such limits and/or fulfill other mail processing needs.

SUMMARY OF THE INVENTIONS

One form of the present invention is a unique mail processing system. Other forms include unique systems and methods for sorting mail. As used herein, "mail" or "mail piece" includes one or more items entrusted with a postal service or private delivery organization for transport to a designated destination.

In a further form of the present invention, a technique for mail processing includes vocal entry of address information by an operator in response to viewing an image of at least a portion of a mail piece.

In another form, two different parts of a mail piece address are each vocally input to a mail processing system. A character representation for one of the parts is determined with the system and used to reduce the number of options for a character representation for the other part based on a predefined relationship between the two parts. As used herein, a "character representation" includes any datum or signal received by, transmitted from, or contained within a machine, computer, processor, memory, or other device that represents one or more written characters of any language.

In still another form of the present invention, a mail processing technique includes fading-out or fading-in a visual display of a mail piece image over a time interval. This image is provided for operator input with a keyboard, voice input device, or other apparatus as would occur to one skilled in the art.

In yet another form, multiple images each corresponding to a different mail piece are uniquely displayed at the same time for operator input. Removal and replacement of one or more of these images may be timed in accordance with this input.

A further form includes utilizing a mail sorter to sort several mail pieces with an optical character recognition routine and determining one or more other mail pieces are unsortable with this routine. Images for these unsortable mail pieces are sent to a remote location having one or more operator input stations arranged to vocally input address information needed to sort the mail pieces determined to be unsortable with the optical character recognition routine.

In yet a further form of the present invention, a display device defines a first region to display one or more mail piece images and a second region to define one or more visual indicators in different or contrasting colors. These indicators may include prompts or confirmation indications corresponding to operator input of information from the one or more mail piece images.

Still a further form includes displaying a first mail piece image, initiating vocal entry of information determined by viewing the first mail piece image, and timing presentation of a second mail piece image relative to this initial vocal input for the first mail piece image. Additionally or alternatively, timing of the removal of the first mail piece image may be performed relative to the initial input. Optionally, this timing scheme may define a period during which the first image may be recalled by the operator in case of error. Either the first image, the second image, or both may be gradually faded-in or faded-out as part of the timing scheme. In still other forms, fading may not be utilized. In another variation, one or more timing parameters may be kept in a profile for each different operator.

In another form of the present invention, an image of a first object is displayed to an operator and information from it is entered into a processing system. Removal of the image is determined relative to the start time for entering this information. Alternatively or additionally, an image of a second object can be displayed to the operator as a function of this start time.

Other forms, embodiments, benefits, advantages, objects, aspects, and features of the present invention shall become apparent from the drawings and description contained herein.

DESCRIPTION OF THE PREFERRED EMBODIMENTS

Figure 1:
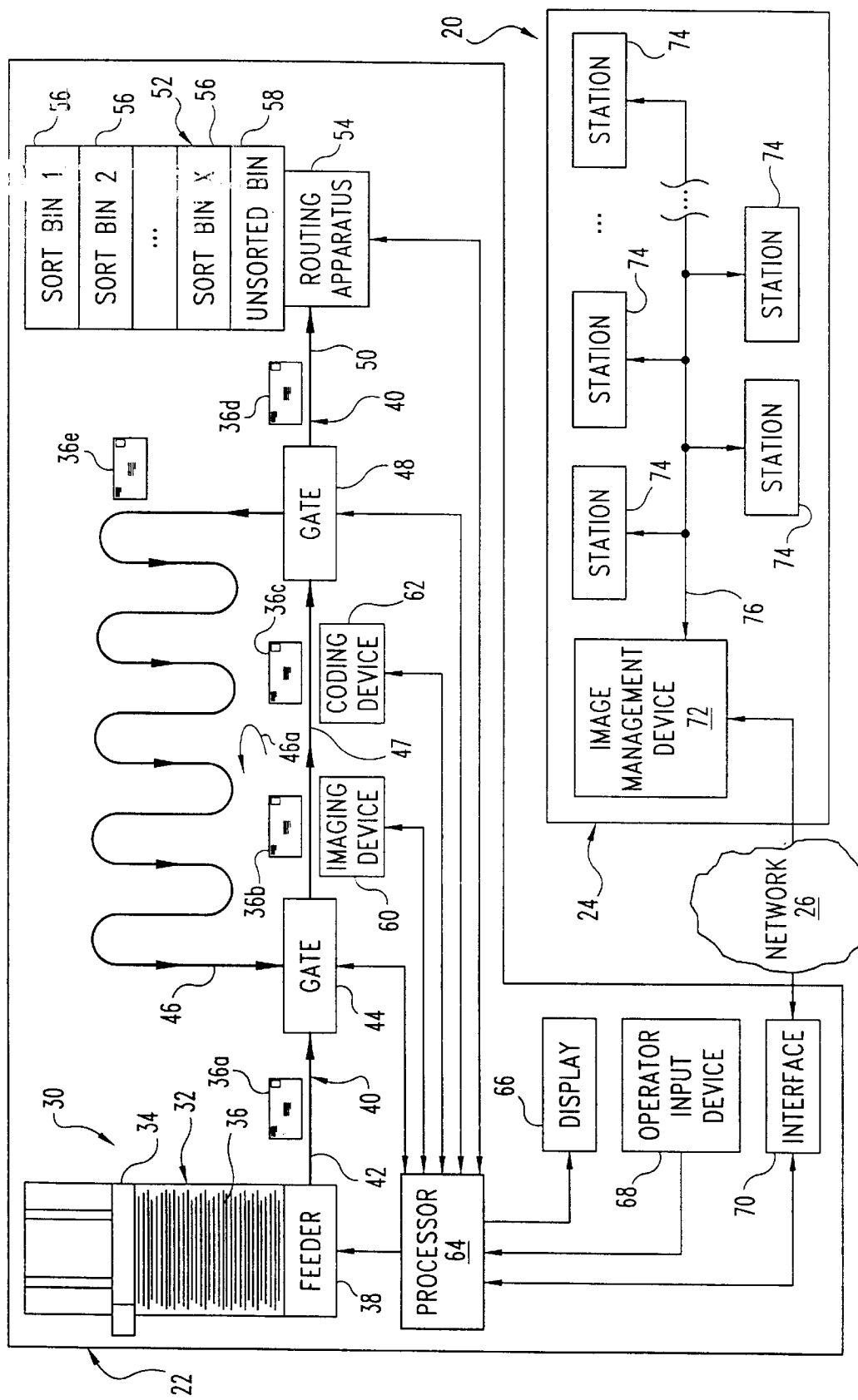
FIG. 1 is a diagrammatic view of a mail processing system.

For the purposes of promoting an understanding of the principles of the invention, reference will now be made to the embodiments illustrated in the drawings and specific language will be used to describe the same. It will, nevertheless, be understood that no limitation of the scope of the invention is thereby intended. Any alterations and further modifications in the described embodiments and any further applications of the principles of the invention as described herein are contemplated as would normally occur to one skilled in the art to which the invention relates.

FIG. 1 illustrates mail processing system 20 of one embodiment of the present invention. Mail processing system 20 includes mail sorter 22 operatively coupled to operator entry subsystem 24 by computer network 26. Network 26 may be of any type, such as a local area network (LAN), a wide area network (WAN), or the internet, to name just a few. Typically, one or more operators are associated with operator entry subsystem 24. In one embodiment, operator entry subsystem 24 is remotely located relative to mail sorter 22 and suitably isolated to reduce operator distractions caused by operation of sorter 22. In other embodiments, operator entry subsystem may be in close proximity to sorter 22 and/or lack such isolation.

Mail sorter 22 includes mail transport mechanism 30. Transport mechanism 30 includes input bin 32 arranged to hold mail stack 36 of varying size. Input bin 32 is of a magazine style with back plate 34 arranged to urge mail stack 36 toward feeder 38 of transport mechanism 30. Feeder 38 singulates and feeds mail pieces from mail stack 36 to transport path 40. In one embodiment, feeder 38 may be of the type disclosed in commonly owned U.S. Pat. No. 5,790,429 to Baker et al. or U.S. Pat. No. 5,862,243 to Baker et al. A few representative mail pieces 36a, 36b, 36c, 36d, 36e are illustrated at various locations along transport path 40. Transport mechanism 30 may include powered rollers, belts, and/or other standard conveying devices to individually advance mail pieces along transport path 40. Also, mechanism 30 may include one or more mail piece sensors to monitor the progress of mail being transported along transport path 40.

Transport mechanism 30 further includes routing gates 44, 48 and output collection device 52. Transport path 40 includes feeder segment 42 for transporting mail pieces from feeder 38 to routing gate 44. Routing gate 44 selectively routes mail from feeder segment 42 or return loop 46 to processing segment 47 of transport path 40. Routing gate 48 is positioned at an opposite end of processing segment 47 relative to routing gate 44 to selectively route a mail piece to return loop 46 or to output segment 50 of path 40. Return loop 46 is alternatively designated as delay queue 46a, the operation of which is more fully explained hereinafter. Output segment 50 delivers mail pieces to output collection device 52 of transport mechanism 30.

Output collection device 52 includes a mail piece output routing apparatus 54 to selectively deliver mail pieces to any of a number of sort bins 56 individually designated SORT BIN 1, SORT BIN 2, . . . , SORT BIN x; where "x" is the total number of sort bins 56 and the ellipsis represents the optional addition of one or more other sort bins 56 that are not shown to preserve clarity of FIG. 1. Typically, each sort bin 56 is associated with one of a number of different mail piece destination regions; where the mail pieces are sorted with sorter 22 according to these regions. Output collection device 52 also includes a re-sort or unsorted mail piece bin 58. Generally, it should be understood that more or fewer sort bins 56, and/or unsorted bins 58 may be included in other embodiments of the present invention.

Along processing segment 47 of transport path 40, mail sorter 22 includes imaging device 60 and coding device 62. Imaging device 60 may be a line scan camera, area camera, array of optical sensors, or such other imaging device or system as would occur to those skilled in the art to capture an electronic image of each mail piece as it passes along processing segment 47. Imaging device 60 is selected to be capable of imaging at least a portion of an address of each mail piece. Coding device 62 preferably includes a printing device operable to impart a selected code to a mail piece, such as a bar code. In other embodiments, a different coding technique such as a magnetically encoded stripe or the like, or a different type of coding device as would occur to those skilled in the art may be additionally or alternatively utilized.

Mail sorter 22 includes processor 64 that is operably coupled to feeder 38, routing gate 44, routing gate 48, output routing apparatus 54, imaging device 60, and coding device 62. Processor 64 can also be operably coupled to one or more conveying devices and mail piece sensors of transport mechanism 30 (not shown). Processor 64 is further operably coupled to operator display 66, operator input device 68, and network interface 70. Processor 64 may be comprised of one or more components configured as a single unit, or when of a multi-component form, processor 64 may have one or more components remotely located relative to the others, or otherwise have its components distributed throughout system 20. Processor 64 may be programmable, a state logic machine or other type of dedicated hardware, or a hybrid combination of programmable and dedicated hardware. One or more components of processor 64 may be of the electronic variety including digital circuitry, analog circuitry, or both. As an addition or alternative to electronic circuitry, processor 64 may include one or more mechanical, hydraulic, pneumatic, or optical elements.

In one embodiment including electronic circuitry, processor 64 includes a standard solid-state digital integrated processing unit operatively coupled to solid-state memory. This memory contains programming to be executed by the processing unit, and is arranged for reading and writing of data in accordance with one or more routines executed by processor 64. Besides memory, processor 64 may include any oscillators, control clocks, interfaces, signal compensators/conditioners, filters, limiters, Analog-to-Digital (A/D) converters, Digital-to-Analog (D/A) converters, communication ports, or other types of circuits as would occur to those skilled in the art to implement the present invention.

Display 66 may be of the Cathode Ray Tube (CRT) type, a Liquid Crystal Display (LCD) type, or other type as would occur to those skilled in the art. Operator input device 68 may include one or more of a keyboard, mouse, microphone, light pen, track ball, or other variety of input device as would occur to those skilled in the art. Moreover, display 66 and operator input device 68 may be provided in an integral form, such as a touch screen computer monitor. Although not shown, besides display 66, one or more other output devices, such as a printer, may be operatively coupled to processor 64.

Processor 64 is arranged to execute one or more routines to sort mail from stack 36 into sort bins 56 of output collection device 52. Further details concerning routines performed with processor 64 are provided in connection with FIGS. 4A-4C described hereinafter; however, additional details concerning operator entry subsystem 24 are first described. Operator entry subsystem 24 includes image management device 72, and a number of operator input stations 74 coupled to image management device 72 by computer network 76. As described in connection with network 26, computer network 76 may be of a LAN, WAN, internet, or other variety as would occur to those skilled in the art. As in the case of output collection device 52, ellipses shown in connection with operator input processing subsystem 24 illustrate the option of one or more additional operator input stations 74 that are not shown to preserve clarity. Generally, it should be understood that more or fewer operator input stations 74 may be included in other embodiments.

Figure 2:
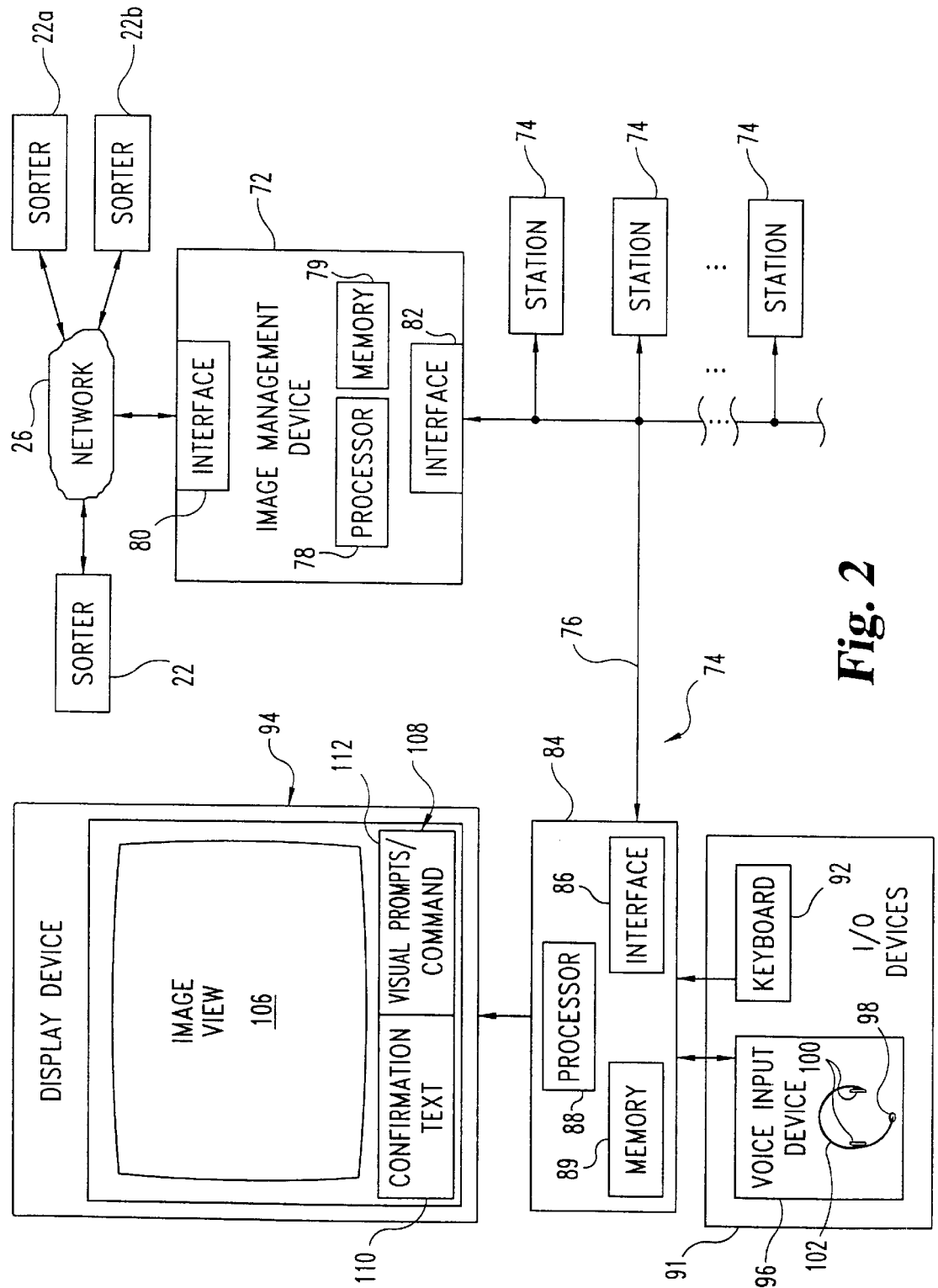
FIG. 2 is a diagrammatic view of an operator entry subsystem for the system of FIG. 1.

Referring additionally to FIG. 2, besides mail sorter 22, other mail sorters 22a, 22b are shown operably connected to image management device 72 of operator entry subsystem 24 by network 26. For other embodiments, more or fewer sorters may be connected in this manner. Image management device 72 includes processor 78, memory 79, interface 80 for coupling to network 26, and interface 82 for coupling to network 76. Notably, if networks 26 and 76 are a common network, such as the internet, only a single interface 80 or 82 may be utilized.

A representative operator input station 74 is further illustrated on the left hand side of FIG. 2, it being understood that the remaining operator input stations 74 can be configured in a like fashion. Station 74 includes processing device 84 with network interface 86 coupled to network 76. Processing device 84 also includes processor 88 and memory 89. Processors 78, 88 of operator entry subsystem 24 may be variously configured as described for processor 64. In one embodiment, processing device 84 is configured as a standard personal computer unit based on a PENTIUM central processing unit supplied by Intel Corporation having a business address of 2200 Mission College Blvd., Santa Clara, Calif. 95052, USA. For this embodiment, processing device 84 utilizes the NT WINDOWS operating system supplied by Microsoft Corporation having a business address of One Microsoft Way, Redmond, Wash. 98052-6399, USA. Furthermore, in this embodiment, with network 76 is in the form of a LAN interconnecting the processing devices 84 of each station 74 to image management device 72, and one or more sorters are coupled to image management device 72 by the internet form of network 26.

By way of nonlimiting example, memory 79, 89 may include one or more of the solid-state, magnetic, and/or optical memory types. Such memory types may include Random Access Memory (RAM), Sequential Accessible Memory (SAM) (such as the First-In, First-Out (FIFO) variety, or the Last-In, First-In LIFO variety), Programmable Read Only Memory (PROM), Electrically Programmable Read Only Memory (EPROM), flash memory or Electrically Erasable Programmable Read Only Memory (EEPROM); an optical disc memory (such as a CD ROM); a magnetically encoded hard disc, floppy disc, tape, or cartridge media; another variety of computer/machine readable medium or media as would occur to those skilled in the art, or a combination of any of these types. Furthermore, memory 79, 89 may be volatile, nonvolatile, or a hybrid combination of volatile and nonvolatile varieties. Also, memory 79, 89 may be permanently installed in processing device 84, in a portable form that may be readily removed and reinstalled, or a combination of these types. Interfaces 70, 80, 82, 86 may be of a standard type suitable for communication with the corresponding network, controllers, and processors with which they are associated.

Besides network 76, processing device 84 is also operatively coupled to a number Input/Output (I/O) devices 91. I/O devices 91 include operator keyboard 92 and voice input device 96. Voice input device 96 includes microphone 98. Optionally, voice input device 96 may also include one or more speakers 100 to provide aural output to an operator as illustrated for operator headset 102 in FIG. 2. A standard sound card or other sound input processing subsystem is included in processing device 84 to interface with voice input device 96. I/O devices 91 may also include other types of operator I/O apparatus such as a mouse, track ball, printer, or light pen, just to name a few. Furthermore, processing device 84 is operatively coupled to display device 94 and includes one or more routines to provide various outputs with display device 94 as more fully explained hereinafter. Display device 94 may be variously configured as described in connection with display 66 of sorter 22. For a personal computer form of processing device 84, display device 94 is preferably a multipixel, video graphics monitor suitable for high resolution image display. Processing device 84 includes a standard video graphics card or other display processing subsystem to interface with display device 94.

Figure 3:
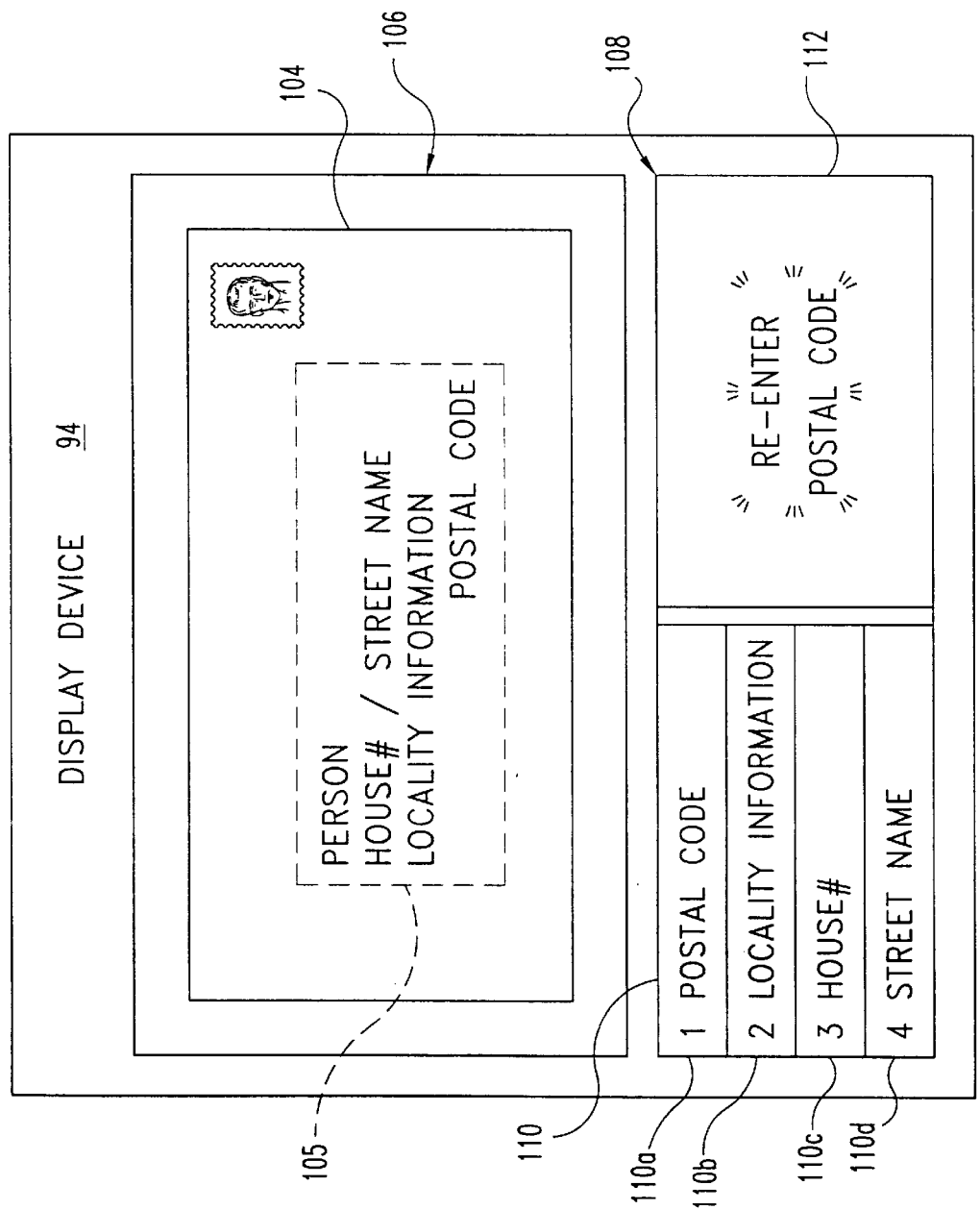
FIG. 3 is a diagrammatic view of a display arrangement for the subsystem of FIG. 2.

Referring to FIGS. 2 and 3, additional details concerning display device 94 are next described. Processing device 84 includes one or more routines to present a mail piece image on display device 94, an example of which is designated by reference numeral 104 in FIG. 3. Mail piece image 104 is presented in mail image region 106 defined on a portion of display device 94 with processing device 84. Processing device 84 further defines status region 108 on another portion of display device 94 below mail image region 106. Status region 108 includes confirmation text area 110 and prompts/command area 112 as labeled in FIG. 2. FIG. 3 provides a nonlimiting example of the type of information that may be provided with mail piece image 104, confirmation text area 110, and prompt/command area 112. Specifically, mail piece image 104 presents a likeness of a front face of a mail piece including address block 105. Address block 105 lists the specific person or entity desired to receive the mail piece followed by a house number (HOUSE#) and street name, locality information, and postal code. Additionally or alternatively, a post office box designation, suite designation, apartment designation, flat number, floor designation, or other address indicia may be included. Within address block 105, locality information may vary from country-to-country. For example, in the United States, this information commonly includes city and state. In other countries, locality information may be absent, or may differ depending on the particular way in which its postal service routes mail and the manner in which the country designates specific regions/communities within its borders. In Australia, the postal service includes a specific address locality designator that may serve as the locality information indicated in block 105. One example of an Australian postal address is:

John Smith
2/477 Plummer Street
Melbourne, VIC 3207

Where "3207" is the postal code and VIC is the locality information. Typically, for a given postal code in Australia, only a subset of all possible locality designations would be properly combinable with that postal code in an address.

Furthermore, the postal code information in address block 105 may differ. The United States Postal Service (USPS) ZIP code of the original five-digit type, nine-digit type (zip plus four), and further enhanced eleven-digit type are but a few examples. In examples for other countries, the postal code may be alphanumeric, purely alphabetical, or include other characters or symbols as appropriate for the particular written language utilized in the destination country. It should be appreciated that address block 105 shows but one typical example of an address and that different address arrangements are also contemplated as are used in any country and in any written language.

Confirmation text area 110 includes postal code confirmation line 110*a*, locality information confirmation line 110*b*, house number confirmation line 110*c*, and street name confirmation line 110*d*. The information in confirmation text area 110 is provided to confirm entry of selected parts of address block 105 by an operator utilizing one or more devices 91 coupled to processing device 84. Visual prompts/command area 112 is provided to prompt and direct action by an operator related to mail piece image 104. For the specific example shown in FIG. 3, the operator is being directed to re-enter the postal code, perhaps because the current entry is incomplete or not recognized. While display device 94 defines two distinct regions 106, 108, in alternative embodiments system 20 may be arranged to provide an image comprising at least a portion of a mail piece address on one part of display device 94 and visual status indicators on another part of display device 94 that may change in terms of location and/or size from one mail piece image to the next.

Figure 4A:
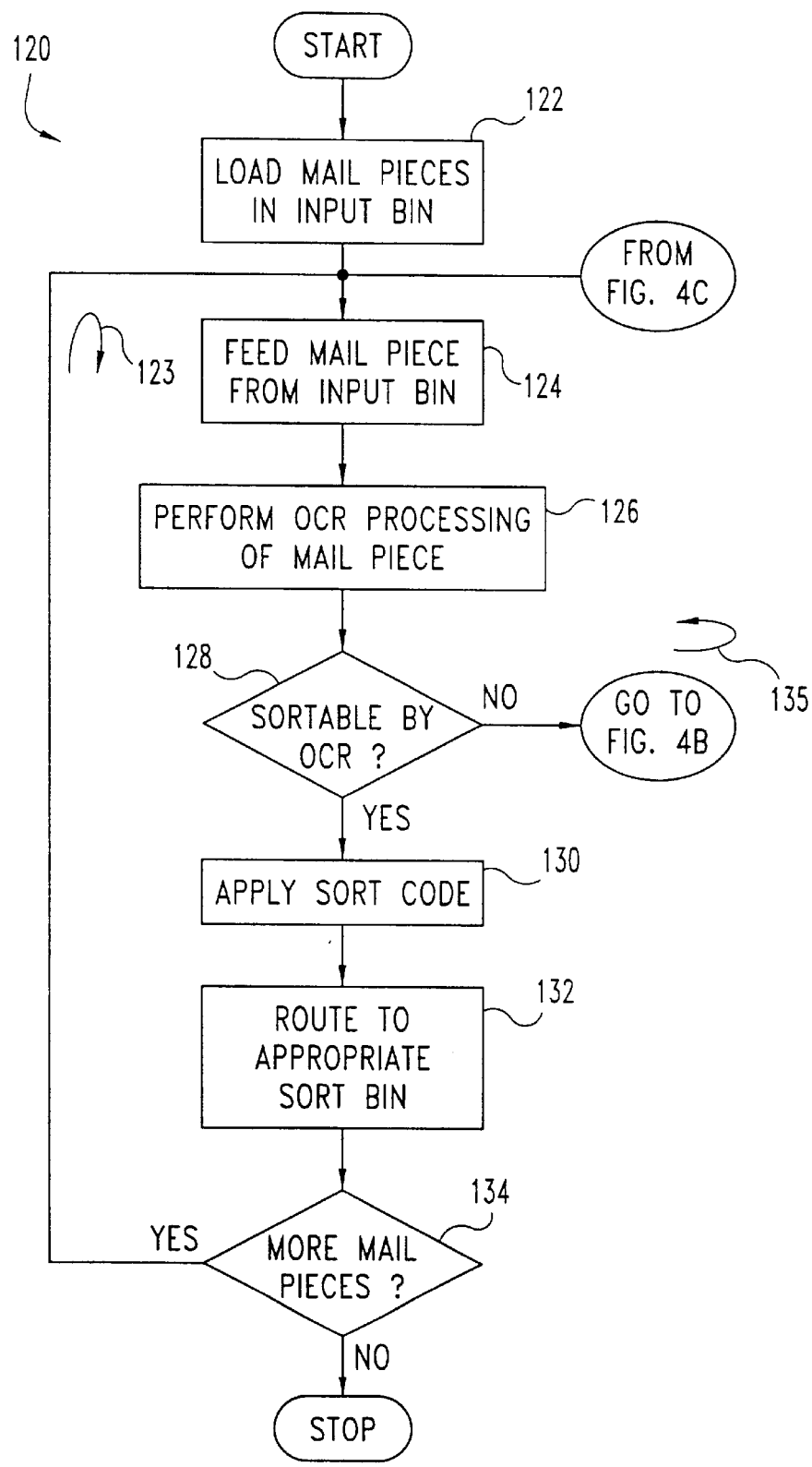
FIGS. 4A-4C present a flowchart corresponding to a mail sorting routine using the system shown in FIG. 1.
Figure 4B:
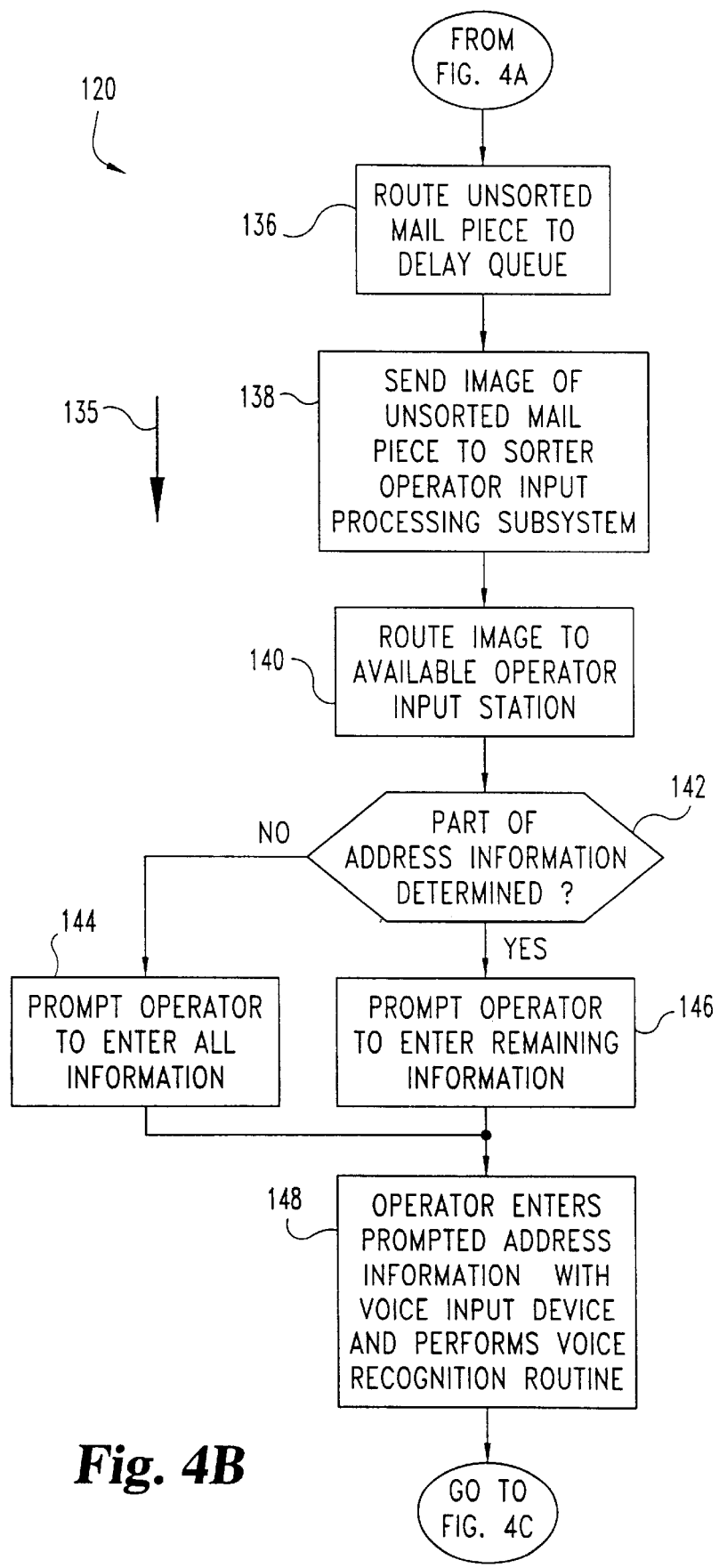
Figure 4C:
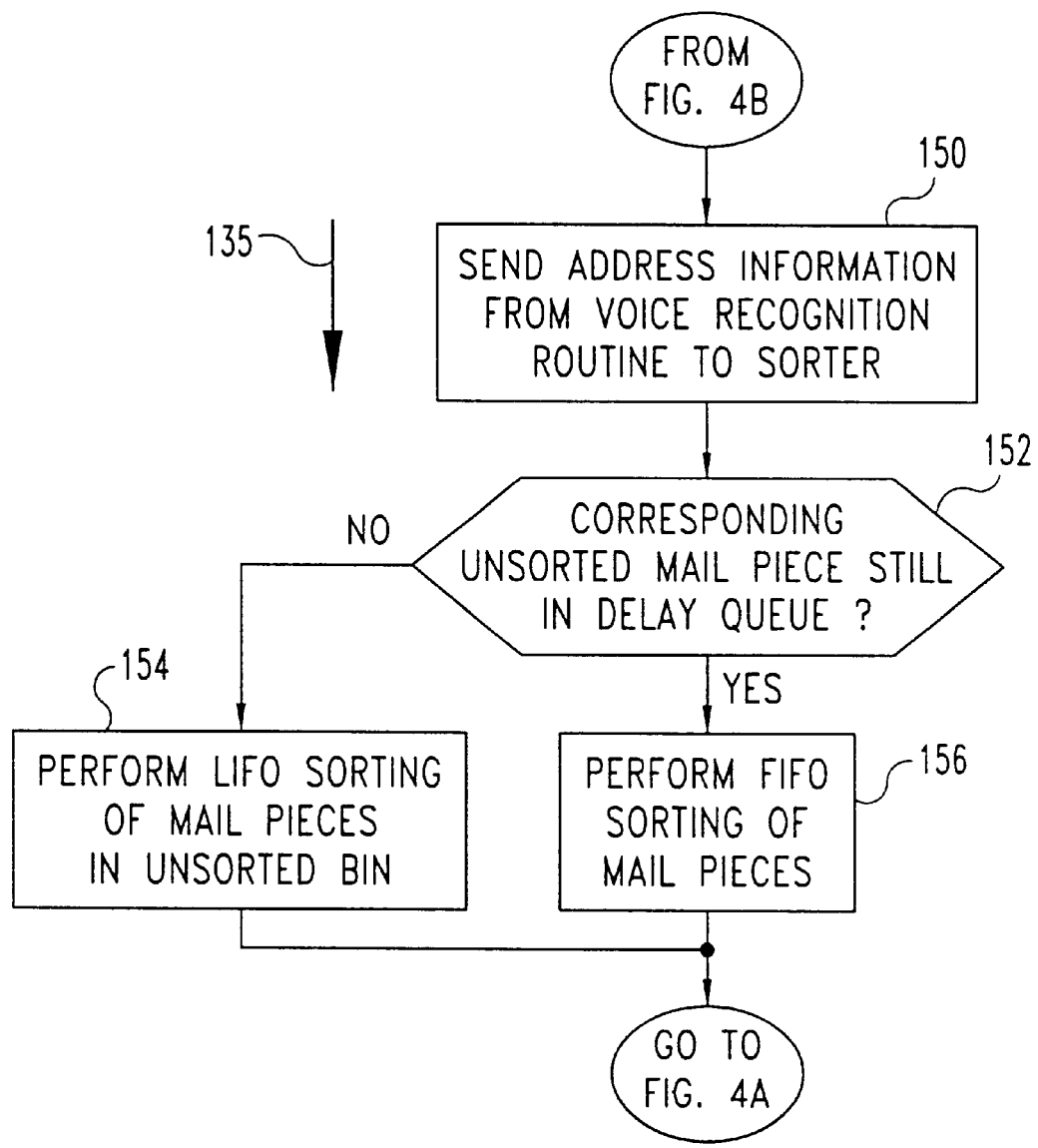

Referring additionally to the flow chart depicted in FIGS. 4A–4C, mail sorting process 120 is illustrated. Mail sorting process 120 begins with loading mail pieces such as shown in mail stack 36 into input bin 32 in stage 122. Next, mail piece sorting loop 123 is entered starting with stage 124. In stage 124, feeder 38 is directed by processor 64 to singulate and sequentially feed the mail pieces from input bin 32 to feeder segment 42 of transport path 40. Mail piece 36*a* is representative of a mail piece along feeder segment 42. Processor 64 may further be arranged to adjust speed of mail being moved along transport path 40 through connection to one or more corresponding transport path conveyor devices that are included in transport mechanism 30. Processor 64 may also be responsive to one or more mail piece sensors along transport path 40 to regulate advancement of mail pieces from one segment or processing point to the next. Information from such sensors may also be used by processor 64 to determine if a malfunction has occurred, and provide a corresponding indication to an operator.

After singulation, processor 64 directs each mail piece along feeder segment 42 to routing gate 44. Processor 64 sends an appropriate routing signal to routing gate 44 to direct the newly fed mail piece to mail processing segment 47 of transport path 40. In stage 126, imaging device 60 images the newly fed mail piece, such as mail piece 36*b* illustrated in FIG. 1, under the control of one or more output signals from processor 64 and returns the image in electronic form to processor 64 for evaluation. This evaluation includes performance of a standard Optical Character Reading/Recognition (OCR) routine aimed at determining address information sufficient to sort the corresponding mail piece to a desired level.

Next, conditional 128 is encountered as part of the OCR routine to determine whether the address information derived from the mail piece image is sufficient to complete sorting, and the imaged mail piece is moved to coding device 62 along processing segment 47. If the OCR routine provides sufficient sorting information, control flows to stage 130 to apply a sort code to the mail piece with coding device 62 as controlled by one or more coding signals from processor 64. Mail piece 36*c* shown in FIG. 3 is representative of mail being processed in stage 130. In one embodiment, the sort code is applied by printing a bar code that encodes at least a portion of the address information for later automated processing of the mail piece. Coding device 62 may alternatively or additionally be used to apply an internal tracking code to track and confirm the identify of mail pieces being processed within mail sorter 22 as more fully explained hereinafter. This internal code may be applied to mail pieces regardless of whether they are sortable by the OCR routine.

After stage 130, control flows to stage 132 to route mail pieces sortable by the OCR routine to the appropriate sort bins 56 with output routing apparatus 54. To reach output routing apparatus 54, processor 64 sends an appropriate routing signal to routing gate 48 to transport mail from processing segment 47 to output segment 50 of transport path 40 as represented by mail piece 36*c* in FIG. 3. Output routing apparatus 54 is responsive to one or more output signals from processor 64 to route each sortable mail piece into the proper sort bin 56 in accordance with OCR processing performed with the respective mail piece image. In one embodiment, processor 64 sends sorting information signals to output routing apparatus 54 to direct each mail piece to the appropriate sort bin 56 based on OCR processing. In another embodiment, output routing apparatus 54 reads the sort code printed with coding device 62 to determine which of the sort bins 56 is appropriate. In still other embodiments, a combination of these techniques, or alternative techniques as would occur to those skilled in the art are utilized. Next, conditional 134 is encountered to determined whether additional mail pieces need to be processed. If so, control returns to stage 124 to repeat loop 123 for the next mail piece. It should be appreciated that a plurality of mail pieces may typically be processed along transport path 40 at the same time with sorter 22, with each being in various stages therealong. If it is determined that no more mail is to be processed at conditional 134, then sorting process 120 stops.

Returning to conditional 128 of loop 123, if a mail piece is determined to be unsortable by OCR processing with mail sorter 22, control branches to operator input loop 135 starting with stage 136 as shown in FIG. 4B. In stage 136, the unsortable mail piece is routed to delay queue 46*a* by directing routing gate 48 with processor 64 to route the mail piece from processing segment 47 to return loop 46. Mail piece 36*e* of FIG. 3 is representative of a mail piece being processed in accordance with stage 136. One or more mail pieces may be accumulated in delay queue 46*a*. Processor 64 may control the speed that mail travels along return loop 46 independent of other segments of transport path 40 to modulate the delay time for queue 46*a*. Typically, delay queue 46*a* is arranged to provide several seconds of delay for each mail piece routed therealong. Mail in delay queue 46*a* may be re-introduced into processing segment 47 on a First-In, First-Out (FIFO) basis by sending one or more appropriate routing signals to routing gate 44 with processor 64. In one alternative embodiment, one or more additional images of a mail piece may be generated by returning the mail piece to imaging device 60 via return loop 46. For this alternative, before determining a given mail piece is unsortable, two or more imaging/OCR processing stages may be performed on such a mail piece without the need to manually reload it.

After a mail piece determined to be unsortable by OCR processing has been transported to delay queue 46a, the image of the unsorted mail piece is sent by processor 64 to operator entry subsystem 24 via network 26. Image management device 72 receives the image of the unsorted mail piece and routes the image to an available operator input station 74 in stage 140 of loop 135. Processing device 84 directs presentation of the mail piece image on display device 94 of the receiving operator input station 74. In addition to the mail piece image, in some cases, OCR processing with processor 64 may determine a portion of the address information. In one example, the postal code may be determined by OCR processing, but additional information desired for sorting, such as locality information, house number, or street name, may not be established with the OCR routine. In another example, postal code and locality information may be determined by OCR processing, but not house number and street name. In still other examples, a different combination of address information parts can be partially determined by OCR processing, and sent along with the image to complete gathering of desired sorting information.

Correspondingly, conditional 142 determines whether a part of the address information has already been determined. If it has, then an operator at the corresponding operator input station 74 is prompted to enter the remaining information in stage 146. If none of the address information has yet been determined, the operator is prompted to enter all desired address information in stage 144. It should be understood that typically the address information desired for sorting purposes is only a subset of all information available from the address. Instead, usually only selected address parts are sought that vary depending on the desired type of sorting, the address format, the destination country of the mail piece, and/or such other factors as would occur to those skilled in the art.

In stage 148, the operator is prompted to enter address information from a mail piece image presented on display device 94 with voice input device 96. In response, one or more vocal inputs are processed by executing a corresponding routine with processor 88. In one embodiment, this routine is encoded on memory 89 of each processing device 84 for each operator input station 74. In another embodiment, at least a portion of this routine is encoded in memory 79 associated with image management device 72 and processor 78. In still other embodiments, a combination of these approaches, or another approach as would occur to those skilled in the art is utilized to provide processing of vocal inputs at a given operator input station 74.

Figure 5A:
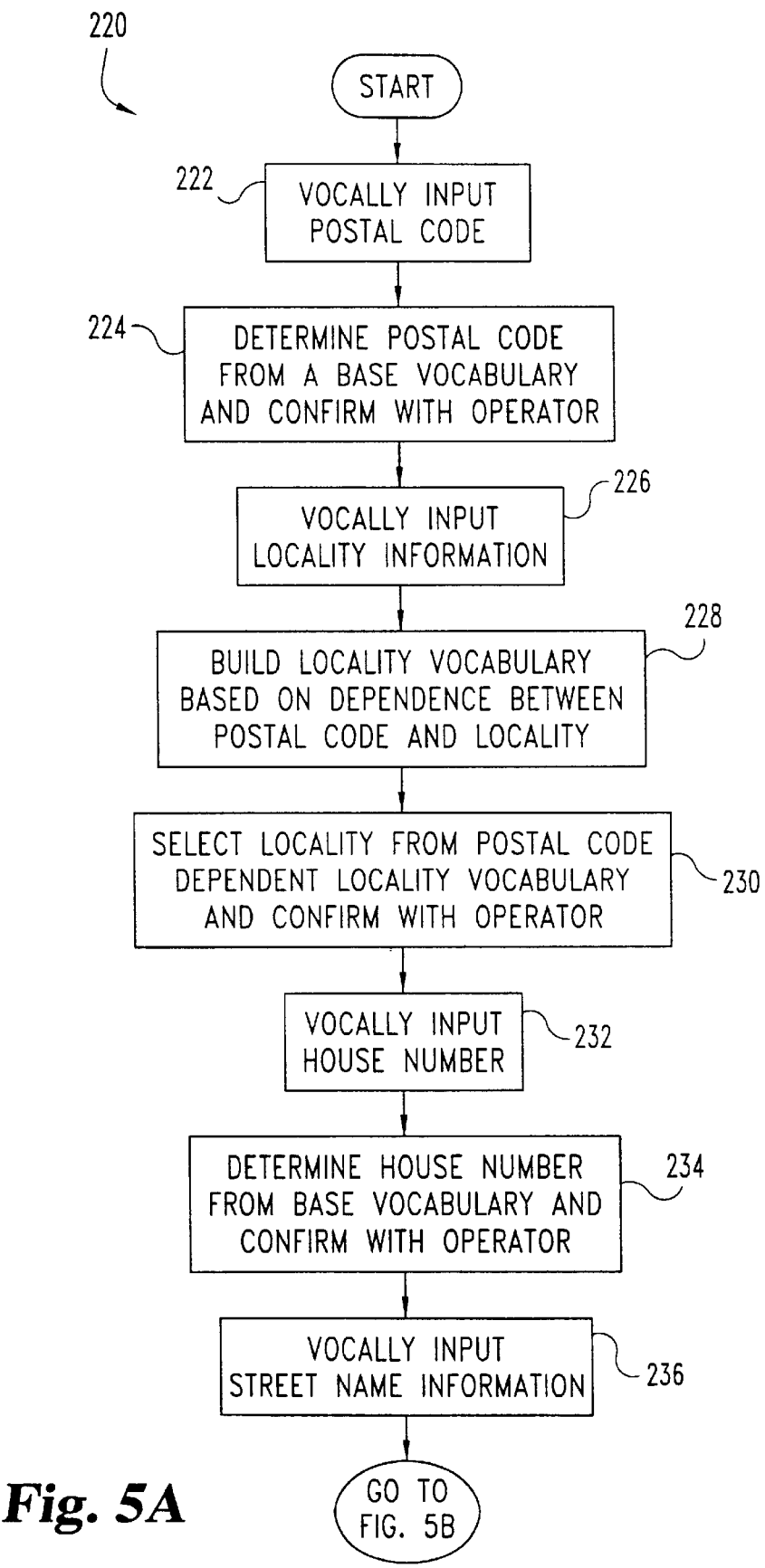
FIGS. 5A-5B illustrate a flowchart for a voice recognition routine performed as part of the mail sorting routine of FIGS. 4A-4C.
Figure 5B:
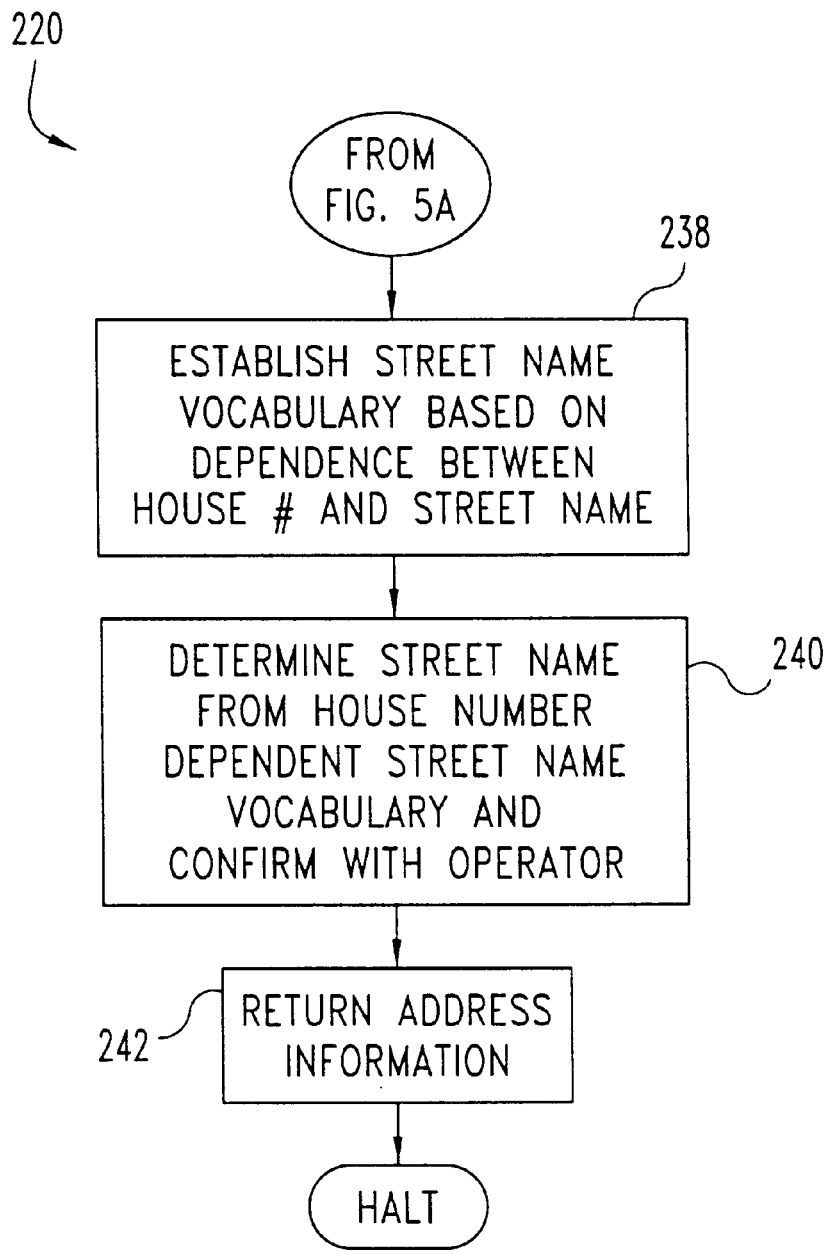

Referring next to FIGS. 5A–5B, a flow chart of voice processing routine 220 performed as part of stage 148 is further described. Voice processing routine 220 begins with stage 222 where the postal code is vocally input to processing device 84 with voice input device 96 by an operator viewing mail piece image 104. In stage 224, a character representation of the vocally entered postal code is determined using a standard voice recognition program that matches an electronic form of a vocal input to one of a set of possible corresponding character representations. This set of character representation options is sometimes referred to as a vocabulary. For the PENTIUM/NT Windows configuration of processing device 84, DRAGON NATURALLYSPEAKING voice recognition software supplied by Dragon Systems, Inc. having a business address of 320 Nevada Street, Newton, Mass. 02160, USA may be utilized. For this example, the Dragon Software references a selected vocabulary through a Standard Application Program Interface (SAPI) in a format defined by the NT operating system. Typically, such reference vocabularies are stored in memory 79, memory 89, or a combination of both. In one application, one or more precompiled base vocabularies permanently reside on a hard disk portion of memory 79, and are cached in a RAM portion of memory 79 during operation. The timing, content, and conditions for interfacing with vocabularies can be controlled by programming using standard techniques. In other examples, other voice recognition programs may be alternatively or additionally utilized suitable for the particular equipment comprising operator entry subsystem 24. Such alternatives may or may not include one or more vocabularies. In still other embodiments, some or all of the voice recognition program and/or vocabulary (if needed) may be provided in the form of dedicated hardware, such as one or more Application Specific Integrated Circuits (ASICs) or suitable Digital Signal Processing (DSP) circuits, to name only a few examples.

Once routine 220 selects a character representation for the postal code, it is presented to the operator in line 110a of display device 94 for confirmation. Next, in stage 226, locality information is vocally input. An Australian address format is used in this example so that the locality information corresponds to one or more words or letters such as "VIC", "Walla Walla", or "NSW". In contrast, the postal code for Australia is typically all numerals such as "2001." Generally, only a few of the address locality descriptors of Australia will correspond to a given postal code. As a result, the number of possible options for localities may be limited based on a dependence between postal code and locality information. Accordingly, in stage 228, routine 220 builds an address locality vocabulary based on the predefined relationship between postal codes and locality information to provide a reduced number of character representation options for the vocal input of locality information in stage 226. This dynamically compiled vocabulary is determined by reference to data that indicates which postal code/locality combinations are possible. In stage 230, the closest character representation of the address locality is selected from the postal code dependent locality vocabulary using the standard matching program as previously discussed. Thus, a different vocabulary is referenced for the postal code than the locality information. The character representation selected for the locality information by the voice recognition program is confirmed with the operator by presenting it in textual form in line 110b of confirmation text area 110.

Continuing with an Australian address example, the house number for an address is vocally input to processing device 84 in stage 232. A character representation of the house number is determined from a corresponding vocabulary and confirmed with the operator in line 110c of confirmation text area 110. Next, in stage 236, street name information is vocally input. In stage 238 of FIG. 5B, a street name vocabulary is established based on a predefined relationship between the previously determined house number from stage 234 and all street names which could correspond to that house number. Notably, this dependence may be used to reduce the number of selections for a character representation of the street name in a corresponding vocabulary by reference to data that indicates which house number/street name combinations are possible. The character representation of the street name is determined from the house number dependent street name vocabulary as established in stage 238 with the standard voice recognition matching program in stage 240. This determination is also confirmed with the operator in line 110d of confirmation text area 110 in stage 240. Additionally or alternatively, the house number and/or street name could be determined based on relationships with postal code and/or locality.

Control then flows to stage 242. In stage 242, the postal code, address locality, house number, and street name are transmitted to image management device 72 from the given operator input station 74 via network 76, which comprises the address information desired to sort the corresponding mail piece for this example. Image management device 72 returns the corresponding address information for the mail piece image 104 to mail sorter 22 via network 26 in stage 242 and processing of the given mail piece image 104 with operator entry subsystem 24 is accordance with routine 220 halts.

It should be appreciated that in both stages 224 and 234 of routine 220, the expected vocal inputs are only numbers. As a result, the same base vocabulary may be utilized. Furthermore, because this common base vocabulary is limited to numbers, it promotes more reliable recognition compared to vocabularies having a broader range of selections. Moreover, this common base vocabulary can include entries corresponding to alternative methods of vocally inputting numbers. For instance, in this embodiment the vocabulary can include entries corresponding to vocal input of each of the ten single digits "zero,", "one," "two," "three," "four," "five," "six," "seven," "eight," and "nine" (0–9). Alternatively or additionally, the numbers may be vocally input in two digit pairs, even for numbers greater than 99, such as the vocal input "ten twenty-six" for 1026, "thirty-one seventeen eighty-three" for 311783, or "seven thirteen eleven" for 71311, to provide just a few nonlimiting examples. Moreover, the vocabulary may be adjusted to recognize the letter "O" as a zero when limited to an all-number form so that the vocal input "fifteen O seven" is recognized as the number 1507. Furthermore, the vocabulary can be expanded to recognize other commonly spoken forms of numbers using terms like "hundred," "thousand," "million," and so on.

Accordingly, the 'base' vocabulary utilized in stages 224, 234 may be precompiled based on training samples input by the operator that typically does not change during use. In contrast, the vocabularies built during stages 228, 238 for locality information and street names, respectively, are dynamic, varying with the context of the vocal inputs recognized with the base vocabulary.

Utilizing another address form, such as that commonly used for the royal mail of the United Kingdom (UK), a different base vocabulary is typically desired. In this instance, the postal code is alphanumeric in nature. For example, a typical UK postal code might be SL4 4PQ; where "SL4" designates a larger region and "4PQ" designates a small group of individual destinations (typically 15) within the larger region. Ordinarily, a given small group designation portion of the postal code is only used with a subset of the larger region portions. As a result, for this format, the postal code may be input in two parts, using a base/precompiled vocabulary for the larger region portion "SL4" and building a dynamic vocabulary for the small group portion "4PQ" with reference to data indicating which combinations are possible. This two-part entry may be performed as previously described in stages 222–230, where the first part corresponds to the postal code of stages 222–224 and the second part corresponds to the locality information of stages 226–230. If desired, the house number and street name may be determined as previously described. Alternatively, the house number and/or street number may be determined through a dependency on the first and/or second part of the alphanumeric postal code. In still other embodiments, it may not be desired to input the house number, street name, or both.

In yet another example, for a United States of America address format, the postal code may be vocally input with character representations determined in total or in part from a base vocabulary. For this format, locality information (city and/or state), house numbers, street names, P.O. Box number, suite number, apartment number, or the like may be determined by applying one or more predefined relationships to provide a dynamic vocabulary with fewer selection options than by independent determination. However, for other embodiments including the processing of mail for Australia, the U.K., the U.S., or any other country, dependencies may not be utilized, instead identifying vocal inputs independent of each other for a given address.

As part of routine 220, it may occur from time-to-time that a character representation for vocally input information cannot be determined by routine 220 or has been determined incorrectly. In the first case, prompt/command area 112 may be utilized to direct re-entry of one or more parts of the address information either vocally or with keyboard 92. One such command is illustrated in FIG. 3 for re-entry of a postal code. Furthermore, visual prompt/command area 112 may be utilized to prompt vocal entry of each address part required and then displaying the corresponding textual representation in area 110 as it is determined. In one embodiment, one or more of the visual indicators used in area 110, 112 are provided in a contrasting color relative to its background and/or other indicators. In another embodiment, each type of indicator is presented in a different color.

In one embodiment, the vocabularies utilized to convert vocal inputs to character representations by routine 220 are established specific to each operator to minimize recognition errors. In one example, each operator reads a prepared script of words and/or numbers suitable to reduce recognition errors for the particular type of address part vocal inputs anticipated to provide one or more desired base vocabularies. These vocal profiles may be maintained separately for each operator. In one configuration, the profiles are stored for the operator entry subsystem 24 in memory 79 of image management device 72 so that it may be readily downloaded to any of the operator input stations 74. In another configuration, such profiles are maintained locally on one or more processors 88 of stations 74. Furthermore, routine 220 may include instructions to update vocabulary entries from time to time to improve recognition capability, and vocabulary entries may be modified from time-to-time in response to new, unrecognized vocal inputs and corresponding character representations. By way of nonlimiting example, new entries in a dynamically built vocabulary can be accumulated "on the fly" as new inputs are encountered during mail processing. Relating this example to routine 220, vocal matching indicia for a given operator's input of locality and/or street names could be added while mail is being processed.

After performance of stage 148, including routine 220, stage 150 of FIG. 4C is encountered. In stage 150, the address information returned by voice recognition routine 220 is forwarded to mail sorter 22 via image management device 72. In conditional 152, sorter 22 determines whether the unsorted mail piece is still in the delay queue 46a. If the unsorted mail piece is still in delay queue 46a, it performs sorting with the returned address information on a First-In First-Out (FIFO) basis from delay queue 46a in stage 156. Stage 156 includes routing the corresponding mail piece from delay queue 46a through routing gate 44 to processing segment 47 of transport path 40 to apply an appropriate code with device 62. After applying a code with device 62, the mail piece processor 64 directs transport through routing gate 48 to output segment 50 and output collection device 52. Output collection device 52 sorts the mail piece into the appropriate sort bin 56 with output routing apparatus 54.

In contrast, if the unsorted mail piece being processed by operator input loop 135 has been placed in unsorted bin 58 of output collection device 52, stage 154 is encountered as a result of the test of conditional 152. Placement of a mail piece in unsorted bin 58 may occur directly from processing segment 47 via output segment 50 for a given mail piece when it is not desirable to utilize delay queue 46a. Such a situation may arise, for example, when delay queue 46a is full or inoperable. Notably, mail pieces passing to unsorted bin 58 typically will be stacked one on another such that the most recently added mail piece to unsorted bin 58 would be the easiest to access. Correspondingly, in stage 154, sorting is performed on a Last-In, First-Out (LIFO) basis. For this operation, output routing apparatus 54 may be configured to transport mail from unsorted bin 58 back to transport path 40 reversing direction along segment 50 and routing it through return loop 46 for processing along processing segment 47 as previously described. Alternatively, output routing apparatus 54 may be configured to relocate each mail piece from unsorted bin 58 into the appropriate sort bin 56 of output collection device 52 directly. In still another embodiment, mail pieces from unsorted bin 58 are re-loaded in input bin 32 for processing along transport path 40 with appropriate indications to processor 64 so that the sorting information returned by operator entry subsystem 24 may be appropriately applied to sort the re-loaded mail. In a further embodiment, unsorted bin 58 may be separate from output routing apparatus 54, being configured to directly receive mail pieces from delay queue 46a and transport mail pieces back to loop 40 under control of processor 64 (not shown). Naturally, in still other embodiments, a different arrangement or combination of techniques may be utilized to sort the contents of unsorted bin 58 in accordance with the address information returned for each unsortable mail piece by operator entry subsystem 24 to mail sorter 22. For any such embodiments, coding device 62 can be used to provide a tracking code on each mail piece regardless of sort status on its first run-through to ease sorting once adequate address information has been provided by operator entry subsystem 24. After performance of stage 154 or 156, control returns to stage 124 shown on FIG. 4A to process the next mail piece, closing loop 135.

Figure 6:
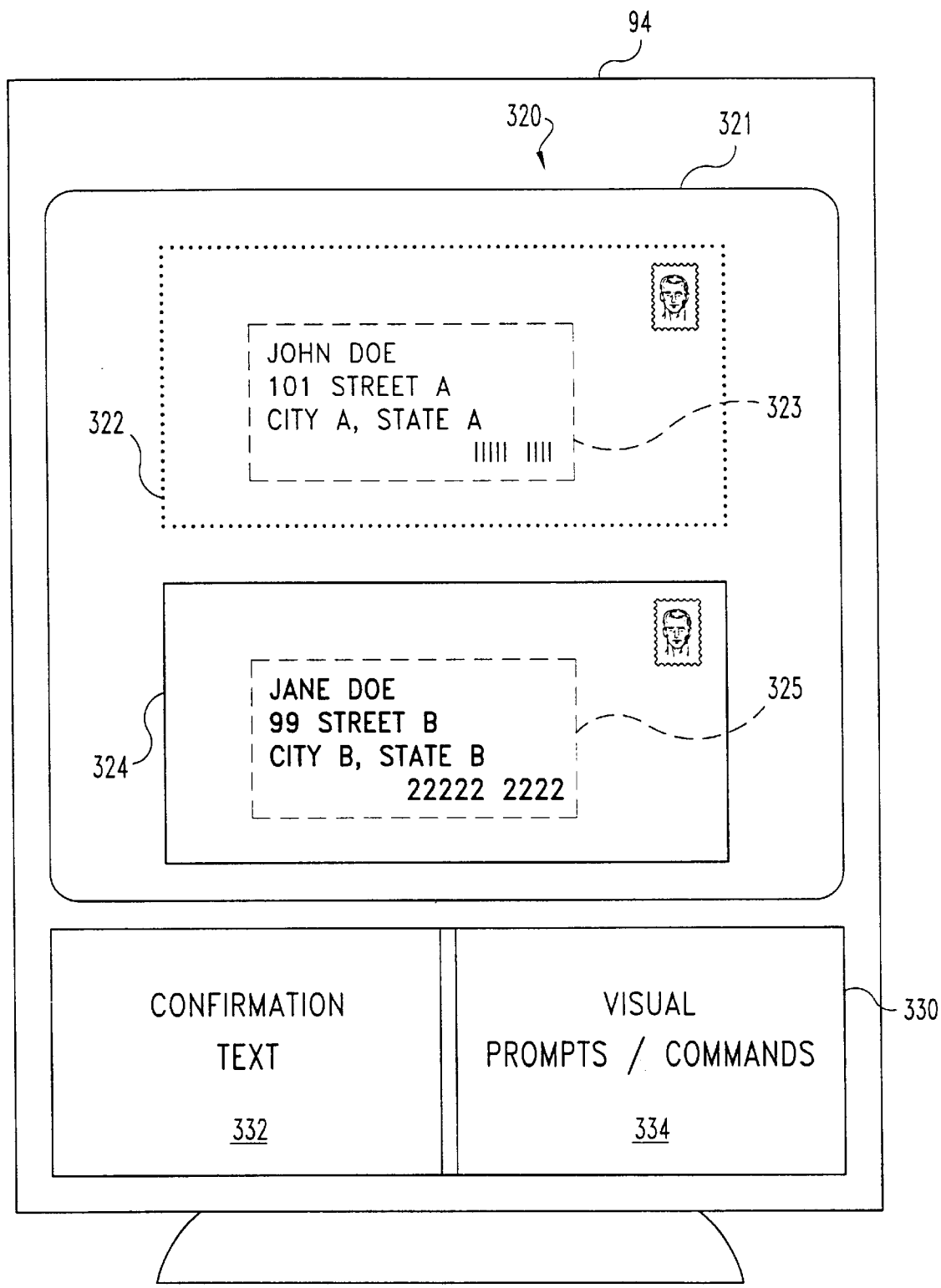
FIG. 6 is a diagrammatic view of an alternate embodiment of an operator input station for the subsystem of FIG. 2.

FIG. 6 diagrammatically illustrates an alternative embodiment of the operator input station of subsystem 24 in the form of multiple image display format 320. Display format 320 can be utilized in place of the format shown in FIGS. 2 and 3 for any of operator input stations 74. The corresponding processing device 84 is configured to provide display format 320 for such operator input stations 74. Display format 320 includes image display region 321 and status region 330. Image display region 321 shows mail piece image 322 having address block 323 and mail piece image 324 having address block 325. Image 322 is shown in a dashed representation to schematically symbolize that it is being presented in less than its full visual intensity because image 322 is being faded-out by processing device 84 over a selected time interval. This fade-out feature has been found to be beneficial for mail piece images where address information entry has been initiated either vocally, by typing, or other means. In contrast, image 324 is shown in a "full" line weight configuration corresponding to its presentation prior to being faded-out. Status region 330 includes confirmation text area 332 and visual prompt/command area 334 that may be utilized in a manner as described for areas 110, 112, respectively.

Figure 7:
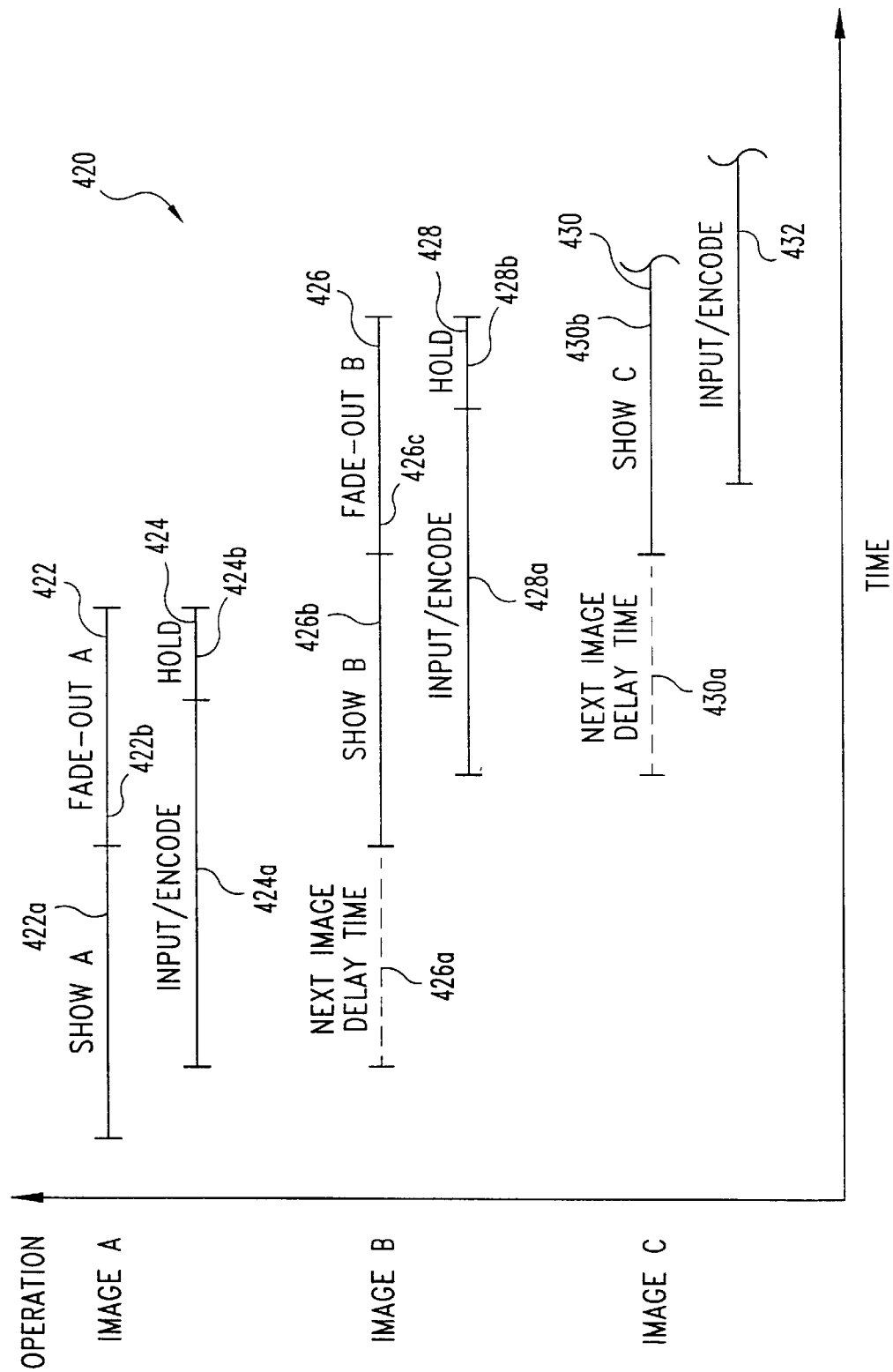
FIG. 7 is a timing diagram illustrating one mode of timing images presented with the operator input station of FIG. 6.

Referring additionally to the image processing and display timing pattern 420 of FIG. 7, one mode of utilizing display format 320 to present a number of mail piece images is illustrated. For FIG. 7, operations pertaining to three sample images, images A, B, C, are spaced along the like labeled vertical axis, and time increases going from left to right along the like labeled horizontal axis. Referring to time segment 422, two consecutive time intervals 422a, 422b are indicated. Image A is displayed with its full intensity over time interval 422a, corresponding to the indicia "SHOW A" in FIG. 7. Fade-out of mail piece image A occurs over time interval 422b, starting in about the middle of segment 422. Time segment 424 overlaps segment 422, and relates to the processing of operator input for image A. Time segment 424 includes time interval 424a during which one or more vocal inputs are provided by the operator and encoded to determine a corresponding character representation of the desired address information for image A. Time segment 424 also includes time interval 424b that immediately follows time interval 424a, and represents a holding period after one or more corresonding character representations have been presented to the operator for confirmation. Time interval 424b overlaps the fade-out period for image A as defined by time interval 422b. During time interval 424b, processing device 84 is configured to be responsive to an operator input to recall mail piece image A to its full line weight to verify proper entry and recognition, and/or correct any errors that may have taken place. This recall may be performed with keyboard 92, voice input device 96, or such other I/O devices 91 as would occur to those skilled in the art.

Mail piece image B is presented in accordance with time segment 426. Going from left to right as time passes, time segment 426 includes three consecutive time intervals, 426a, 426b, 426c. Delay time interval 426a is shown in broken line form, and corresponds to a predetermined delay time that starts at the beginning of time segment 424 for image A. After the passage of the delay time interval 426a, image B is shown beginning with time interval 426b shown in solid line form. Fade-out time interval 426c represents the gradual fade-out of image B as previously described for time interval 422a with respect to image A. Where images A, B respectively represent images 322, 324, the presentation of images 322, 324 in FIG. 6 corresponds to a point in FIG. 7 where intervals 422b and 426b overlap.

Input and encoding of mail piece image B begins at some point after it is initially presented, as represented by the left most end of time segment 428. Time segment 428 includes consecutive time intervals 428a, 428b. The input/encoding of mail piece image B begins with time interval 428a, overlapping the fade-out of image B over time interval 426c of time segment 426. As in the case of segment 424, a recall time or hold time is represented by time interval 428b, following time interval 428a. Processing associated with image C corresponds to partial time segments 430, 432 in a manner as previously described for time segments 426, 428 for image B, respectively. The terminal portions of segments 430, 432 are not shown to preserve clarity. Time segment 430 includes a presentation delay represented by time interval 430a of segment 430. Time interval 430a is shown in broken line form and has the same timing relationship to time interval 428a as explained for the time intervals 424a and 426a. The corresponding display time period for image C ("SHOW C") is represented by time interval 430b of partial time segment 430, and the corresponding input/encoding period for image C is represented by partial time segment 432.

In one embodiment, the hold time interval 424*b* and 428*b*; the pre-presentation delay time interval 426*a*, 430*a*; or both are dynamically adjusted to the performance of a given operator. Correspondingly, a different operator profile may be maintained relating to one or both of these time interval parameters. Such a profile may be selectively referenced based on operator identity determined from an initial operator log-in procedure. Additionally or alternatively, this profile may be included with appropriate operator vocabularies for performing routine 220.

Figure 8:
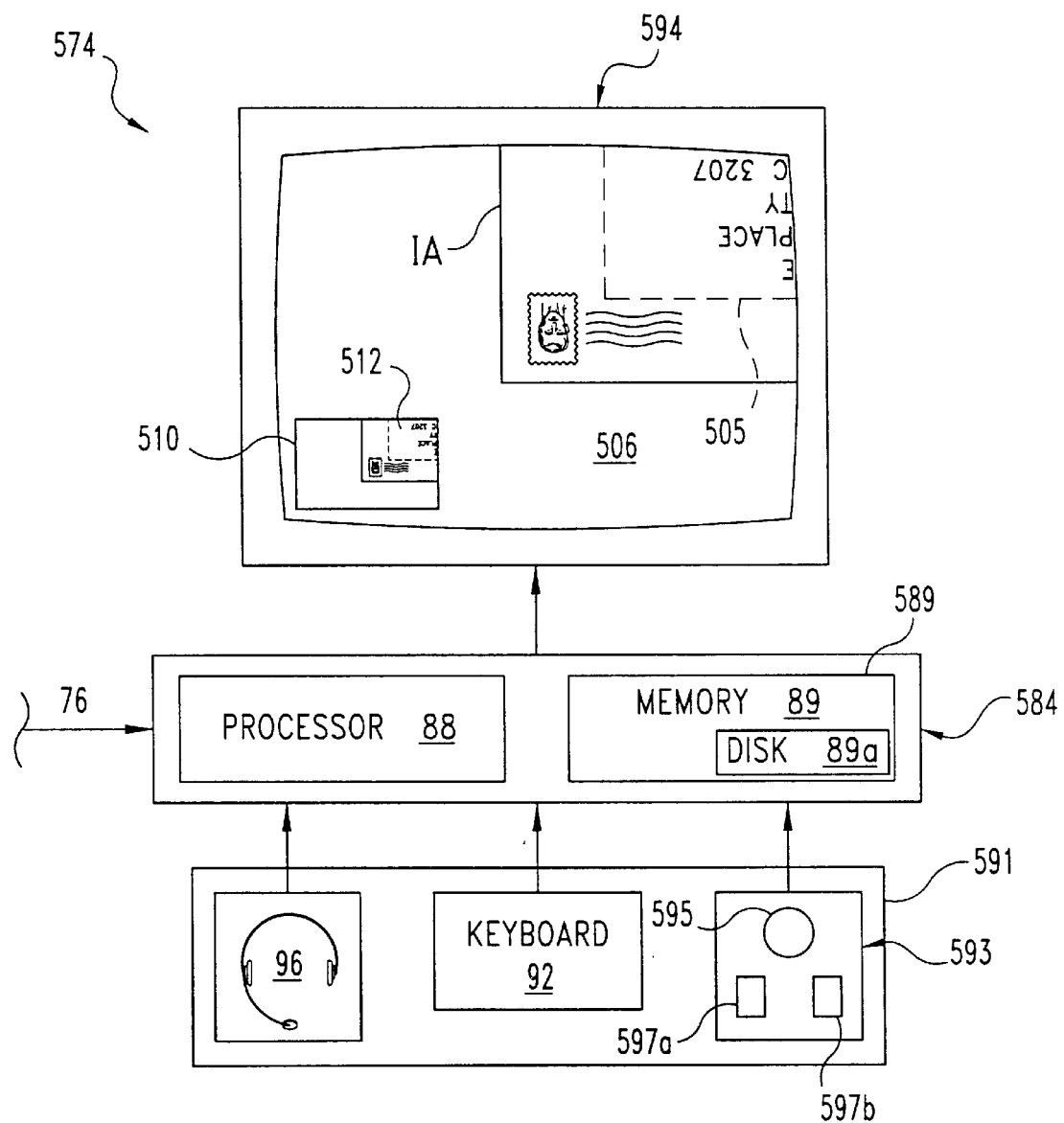
FIG. 8 is a diagrammatic view of another alternative embodiment of an operator input station for the subsystem of FIG. 2.

FIG. 8 provides a diagrammatic view of operator input station 574 that is interchangeable with any of stations 74 of operator entry subsystem 24. Operator input station 574 includes processing unit 584. Processing unit 584 includes processor 88 and memory 89 as previously described. Memory 89 is further illustrated with a portable, computer readable disk device 89*a*. Disk device 89*a* may be of the electromagnetic variety (such as a floppy disk), optical variety (such as a CD ROM or DVD disk), or such other variety as would occur to those skilled in the art. Memory 89 and disk 89*a* are alternatively designated computer readable apparatus 589; where "computer readable apparatus" is used herein to broadly refer to one or more constituents or components of a processor, computer, or machine readable memory. It should be understood that for operating input station 574, memory 89 may include one or more memory types or varieties as previously described.

Operator input station 574 also includes I/O devices 591. I/O devices 591 include keyboard 92 and voice input device 96 as previously described for operator input station 74 that are each operatively coupled to processing device 584 in the manner previously described for processing device 84. I/O devices 591 also include track ball device 593 operatively coupled to processing device 584. Track ball device 593 includes ball 595 that is positioned in a recess defined by device 593 and is moveable with two rotational degrees of freedom. The motion of ball 595 is sensed and output to permit use of track ball device 593 as a pointing device when manipulated by an operator. Track ball device 593 also includes push button switches 597*a*, 597*b* for an operator to provide selected discrete inputs to processing device 584.

Operator input station 574 further includes display 594 to visually provide information in response to one or more output signals from processing device 584. Display 594 is operably coupled to processing device 584 as previously described for the interface of display device 94 with processing device 84. Mail piece image IA is illustrated in an upper right hand corner of image field 506 of display 594 as defined with processing device 584. Besides image field 506, processing device 584 also defines an image locator 510 on display 594. Locator 510 presents a small scale "picture-in-a-picture" view of image field 506 in locator field 512.

Because mail piece images received from one or more of sorters 22, 22*a*, 22*b* may be differently sized and oriented, sometimes the initial presentation of a mail piece image, such as image IA, is not suitably scaled and positioned to view desired address information from address block 505. The relative position of image IA in field 506 in FIG. 8 is one such example. In fact, in some instances, most, if not all, of image field 506 may be occupied by a blank part of the mail piece image or otherwise lack any markings useful in perceiving and locating address block 505. The miniature view provided by locator field 512 may be used to inform an operator of the area of image field 506 occupied by the mail piece image to assist in determining what re-sizing and/or reorientation might be desirable.

In one embodiment, processing device 584 is configured as a personal computer with processor 88 including a PENTIUM-based device and memory 89 being comprised of RAM, hard disk, floppy disk, and CD or DVD ROM devices. For this embodiment, display 594 may be a high-resolution, video graphics monitor of the CRT or LCD type. In other embodiments, a different arrangement of processing device 584, display 594, and I/O devices 591 may be utilized as would occur to those skilled in the art. In one such alternative, a mouse device is used in place of track ball 593. In other alternatives, such pointing devices may be absent, or different I/O devices types may be utilized, such as a light pen, digitizing tablet, or printer just to name a few.

Figure 9:
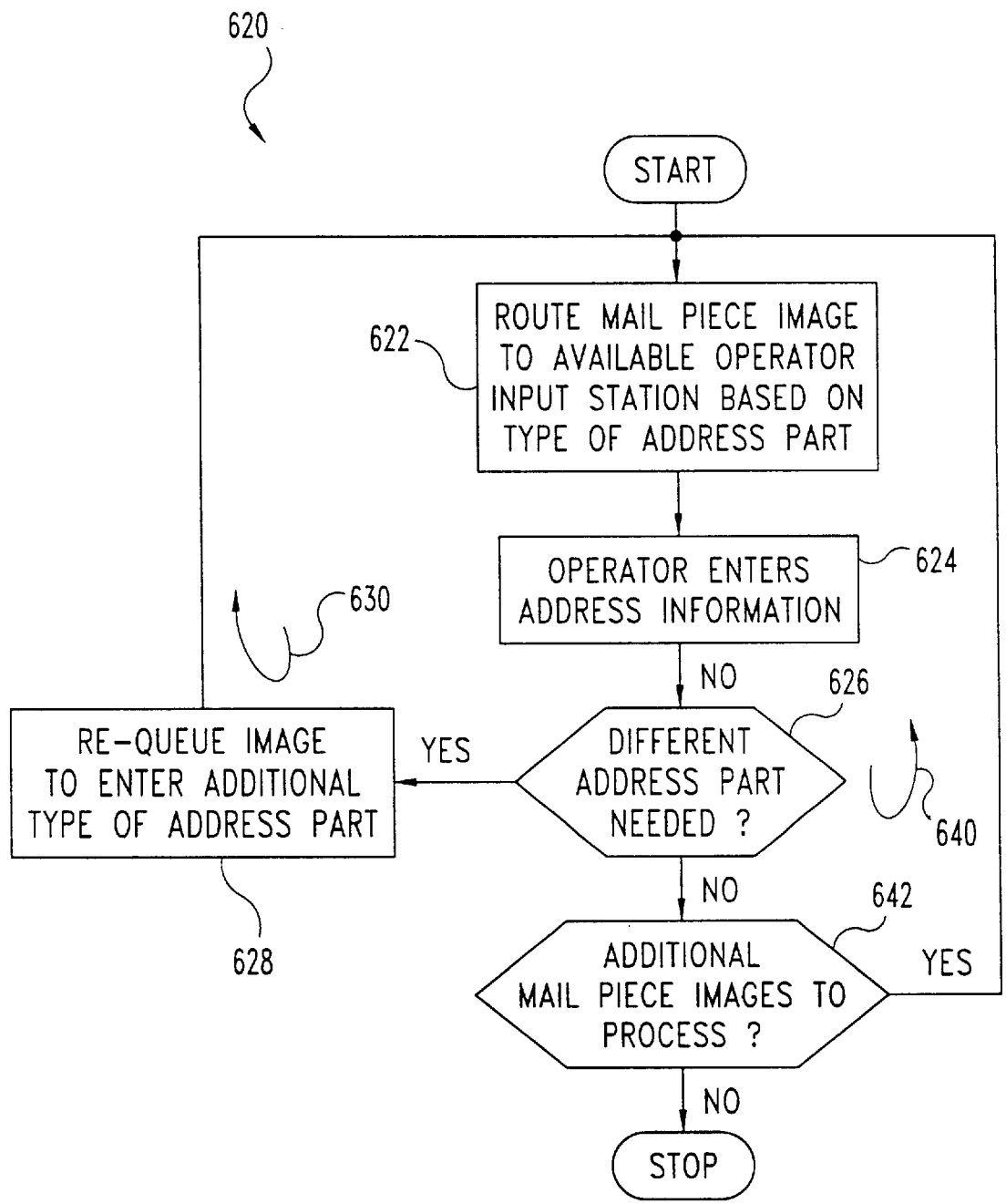
FIGS. 9 and 10 illustrate flowcharts of mail image processing performed with one or more of the operator input stations of FIG. 8.

FIG. 9 illustrates a flow chart of mail processing procedure 620. Procedure 620 is performed with system 20 as an alternative or addition to previously described processors, routines, and procedures. In procedure 620, the entry of different address information parts for a given mail piece is allocated to separate processing stages. Typically, different operator input stations and/or operators input the desired parts of the desired address information to reduce variability in the entry routine. In stage 622 of procedure 620, an image is routed by image management device 72 to one or more operator input stations 74, 574 based on the address information part for which entry is desired. In one example, this part may be some or all of the postal code. In another example, the address part type may be one of a locality designation, a house number, or a street name. In still another example, the desired part type may be a subset of a postal code, a locality designation, a house designation, an apartment designation, a suite designation, a floor designation, a post office box designation, and a street name designation. In operation 624, an operator at the operator input station 74, 574 to which the image is routed, vocally enters the appropriate address information part. One embodiment of operation 624 that utilizes operator input station 574 is further illustrated as entry routine 650 in FIG. 10 to be more fully described hereinafter.

Next, conditional 626 is encountered that tests whether a different address part is needed for the given image and corresponding mail piece being processed. If an additional address part is needed, then the image is re-queued or restricted by the image management device 72 in stage 628 of return loop 630. Return loop 630 of procedure 620 directs control back to stage 622 to process the next mail piece image. It should be understood that the same mail piece image may be sent to different operators and/or operator input stations 74, 574 for input of different address parts. This approach may be used in conjunction with the application of different vocabularies for each part, including vocabularies based on a relationship to a previously entered address part as described in connection with routine 220 of FIGS. 5A–5B. By processing the same address part repetitively at a given operator input station 74, 574; only one such corresponding vocabulary needs to be present at that station. As a result, fewer vocabularies need to be entered for a given operator. In other embodiments, it is desired to process only one address part for each address or to process each of two or more desired address parts for a given address independently—disregarding any relationships between the two or more parts that may be used to reduce the possible character representation options. Indeed, the impact of processing delays between vocal entry of different address parts may be mitigated by dividing the processing of each part requiring a different vocabulary among different operator input stations 74, 574.

If the test of conditional 626 is negative—that is no further address parts are needed for the image—then procedure 620 proceeds with conditional 642. Conditional 642 tests whether other (different) mail piece images need to be processed. If there are additional mail piece images to process, procedure 620 proceeds to stage 622 to process the next image via return loop 640. On the other hand, if the test of conditional 642 is negative (no images to process), then procedure 620 halts.

Figure 10:
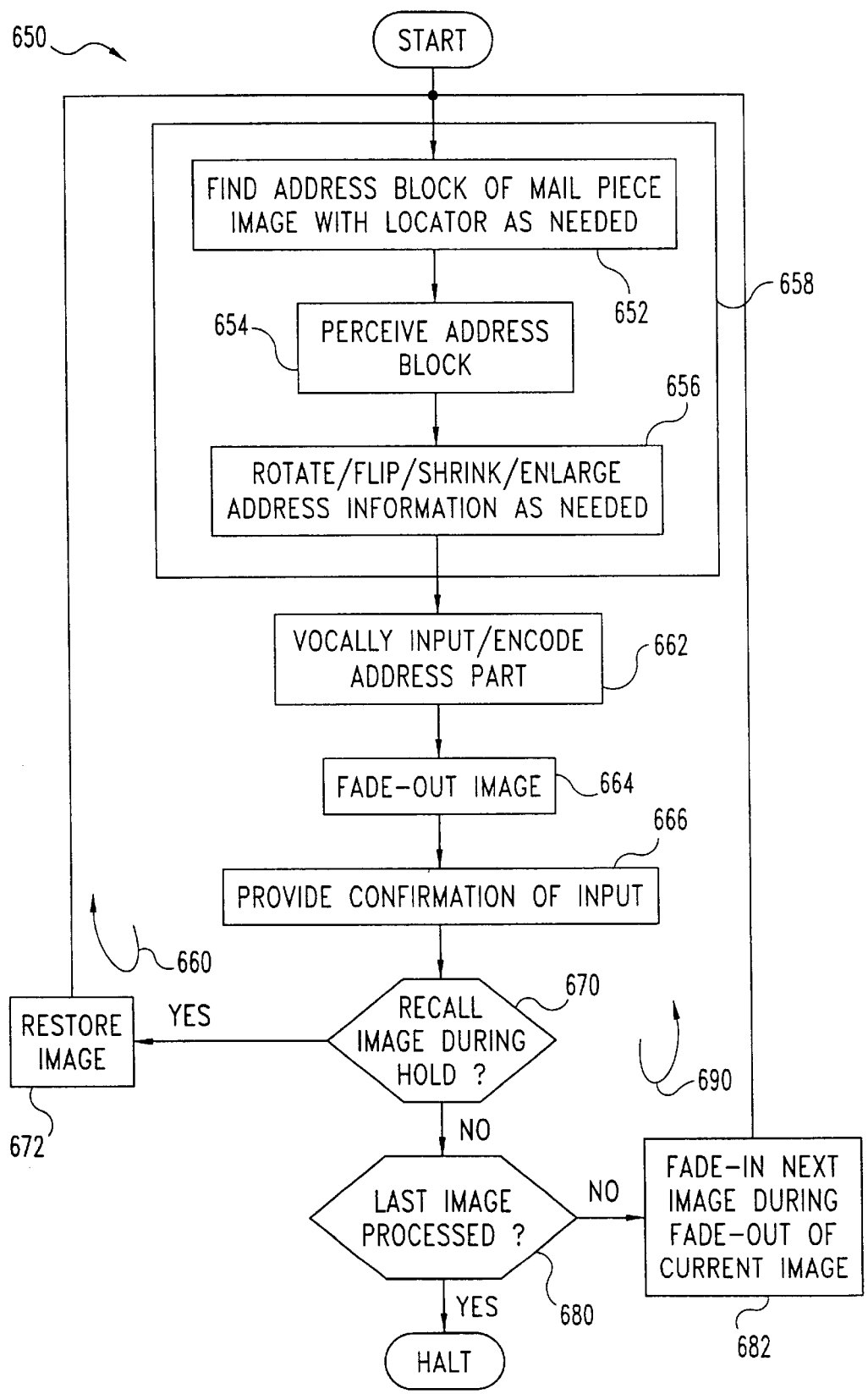
Figure 11:
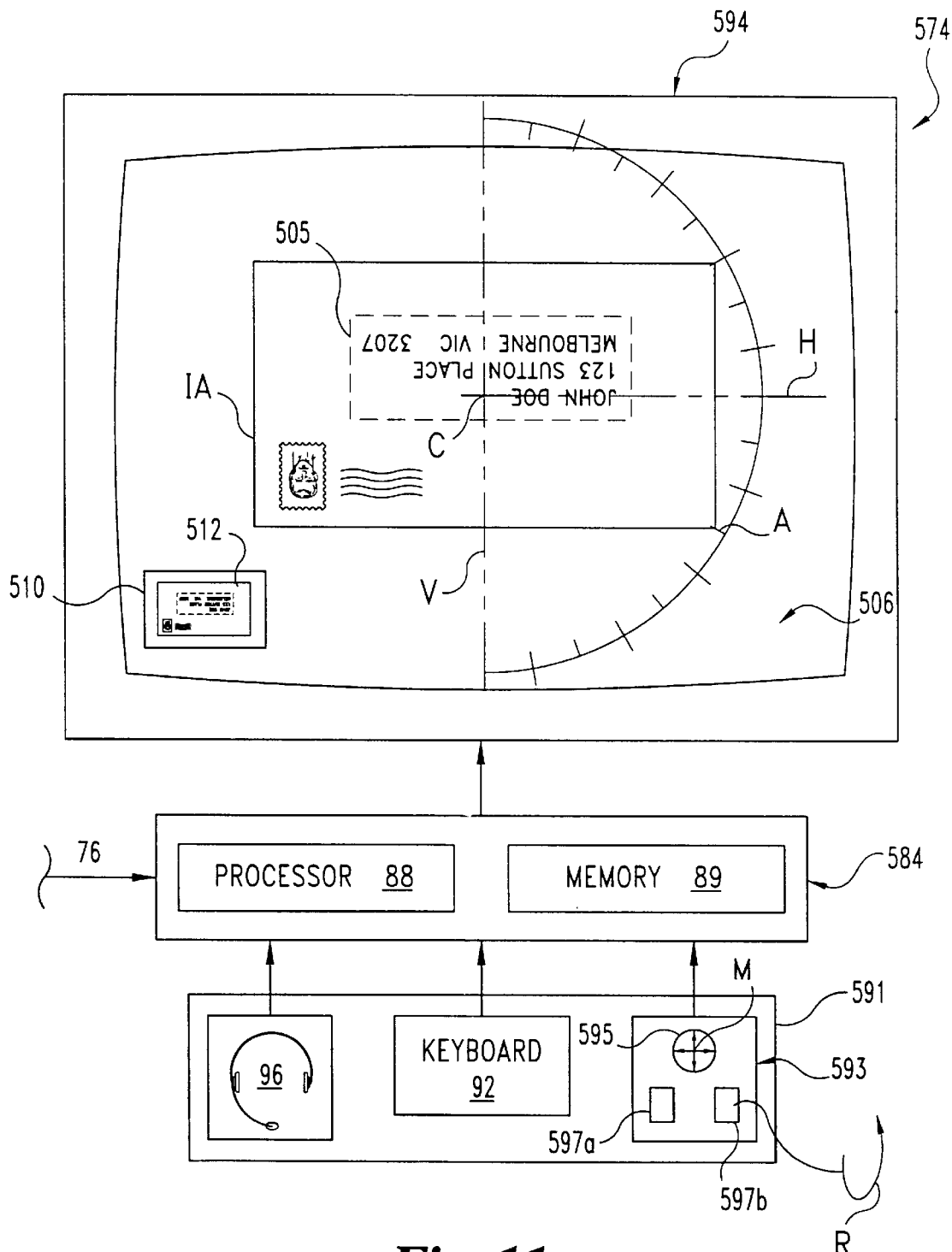
FIGS. 11–13 illustrate the operator input station of FIG. 8 in different configurations corresponding to selected stages of the routine depicted by the flow chart of FIG. 10.

The flow chart of FIG. 10 illustrates operator entry routine 650 that may be performed as an embodiment of operation 624 of procedure 620. Alternatively or additionally, routine 650 may be performed in connection with one or more other processes, routines, or procedures. Routine 650 can be executed with system 20 including at least one operator input station 574. Routine 650 starts with stage 652. In stage 652, the operator locates at least a part of address block 505 using locator 510 as necessary. Referring also to FIG. 11, operator input station 574 is again illustrated, showing image IA in a different position in field 506 relative to that shown in FIG. 8. Execution of stage 652 may include moving image IA as needed using locator 510 as a guide to properly position address block 505. The change in position revealed by comparing FIGS. 11 and 8 is but one nonlimiting example of this type of movement. Operator input station 574 is arranged to respond to inputs from track ball device 593 to reorient images in field 506. In one embodiment, ball 595 is rotated to adjust image position relative to axis V and axis H illustrated in FIG. 11; where axes V and H nominally correspond to vertical and horizontal directions, respectively. Translational movement along the "V/H plane" defined by axes V and H generally corresponds to movement along the double-headed crossed pair of arrows M shown overlaying ball 595 in FIG. 11.

Stage 654 corresponds to the location and perception by the operator of at least a portion of address block 505. If block 505 is still not properly sized or oriented for entry of the desired address part, then mail piece image IA is reoriented by rotation, flipping, shrinking, and/or enlarging in stage 656. These operations may be performed in response to inputs with buttons 597a, 597b, of track ball device 593. For example, a rotation operation may be performed by depressing button 597b as symbolized by loop R in FIG. 11. Alternatively or additionally, keyboard 92 and/or voice input device 96 may be utilized for operator inputs to partially or completely perform stages 652, 656. Stages 652, 654, 656 are collectively designated image preparation sequence 658 of routine 650.

Figure 12:
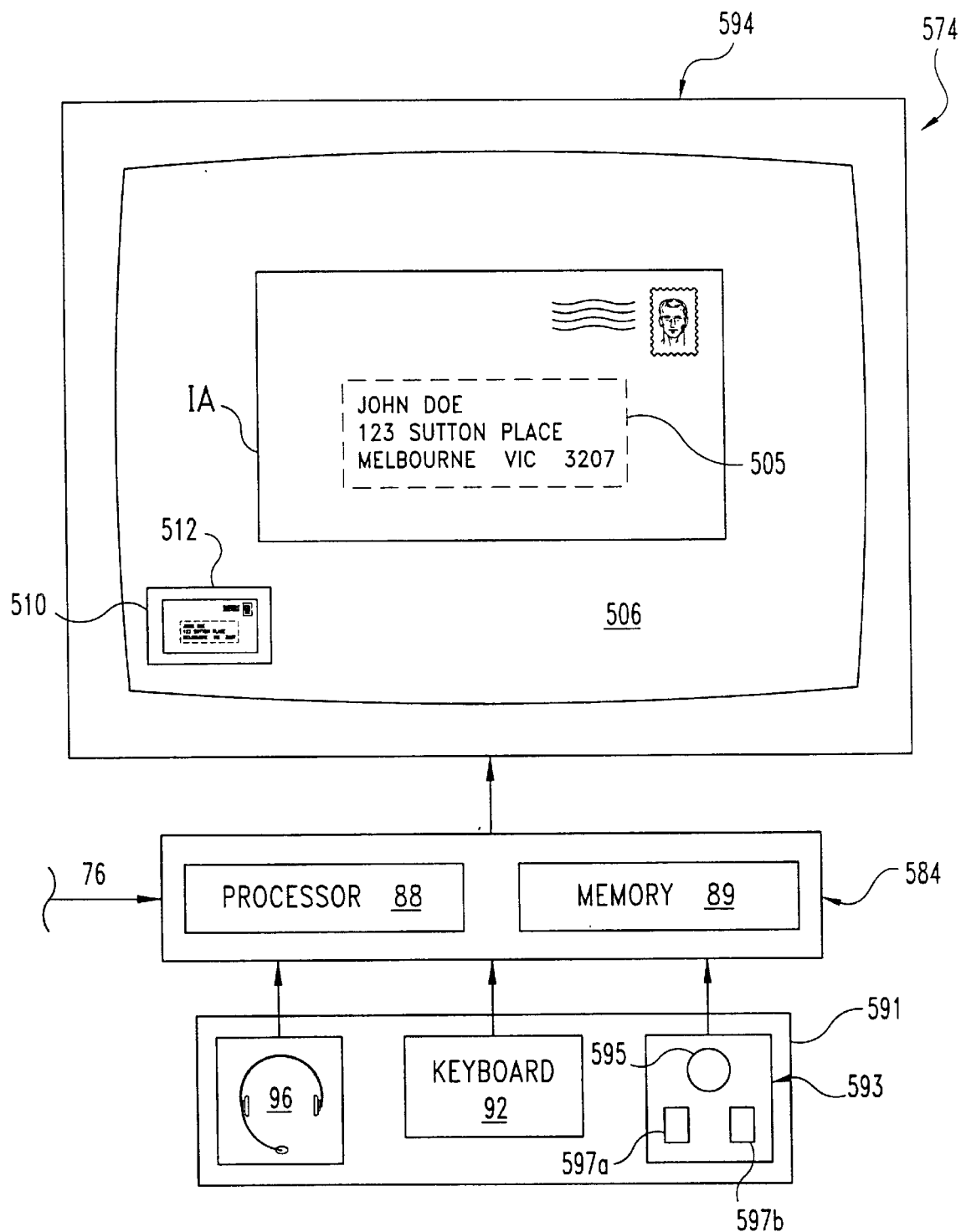

FIG. 12 illustrates image IA after repositioning along axes V and H, rotation about an axis perpendicular to the view plane of FIG. 12, and resizing (shrinking in this case). Once the image is oriented so that the operator can perceive the desired address part, the operator provides a corresponding vocal input with voice input device 96 in stage 662. Besides vocal entry, stage 662 also includes voice input recognition processing and encoding to determine a corresponding character representation for the desired address part with a standard voice recognition program as described in connection with routine 220. It should be understood that for entry of a single uniform address part at a given operator input station 574, only one recognition vocabulary may be needed to match the voice input to a character representation. This vocabulary may be of a precompiled, independent type or of a dependent type with its contents determined from a relationship to one or more previously entered address parts.

In one application of the independent vocabulary type, a numeric postal code is the only part type entered for a given operator input station 574. In another application, a dependent vocabulary type is utilized to determine a locality designation; where the vocabulary content is based on a relationship between all possible locality designations and a previously determined address part, such as a postal code. In still another application, a house number may be entered as the desired address part in stage 662 by reference to an independent voice recognition vocabulary for numbers. At another operator input station, a street name may be entered as the desired address part in stage 662 with a dependent vocabulary of street names determined relative to the previously entered house number. In yet other examples, it may be desired to use multiple vocabularies in performing routine 650. In one such instance, an independent vocabulary corresponding to a first part of the royal mail postal code and a dependent vocabulary corresponding to the second part of the royal mail postal code may be incorporated to determine royal mail postal codes in stage 662. It is further envisioned that numerous other types of independent vocabularies, dependent vocabularies, or vocabulary combinations may be utilized in other embodiments of routine 650. In one alternative embodiment, only independent vocabularies are used for each address part, disregarding any relationships with one or more other address parts of the given address that might be used to provide a vocabulary with reduced character representation options.

It has been found that it can be desirable to control the orientation of a given mail piece image in a manner so that an operator perceives the desired address part to be entered even as it is moving in response to one or more operator inputs. By avoiding substantial interruption of visual perception, the operator can begin providing the vocal input as soon as perceiving it instead of having to iteratively reacquire the image after each movement. Correspondingly, in one embodiment, it is desired to slow image movements during reorientation in sequence 658, such that the movements are generally perceived to be continuous along field 506. For example, to turn the upside down address block 505 depicted in FIG. 1I to the right side up depiction of FIG. 12, image IA rotates along the tick-marked, semi-circular arc A to maintain a generally constant visual perception of it. Accordingly, an operator may begin entry of the relevant address part even as it is moving as opposed to having to wait until motion is stopped. In contrast, a jumpy, intermittent movement resulting in a loss of perception and fixation on the image as it is moved in field 506 can delay perception of the address part and can also contribute to eye fatigue. Even so, in other embodiments, maintaining an operator's visual perception of an image during reorientation may not be desired. Indeed, in still other embodiments, repositioning or reorientation of the mail piece may not even be desirable.

Figure 14:
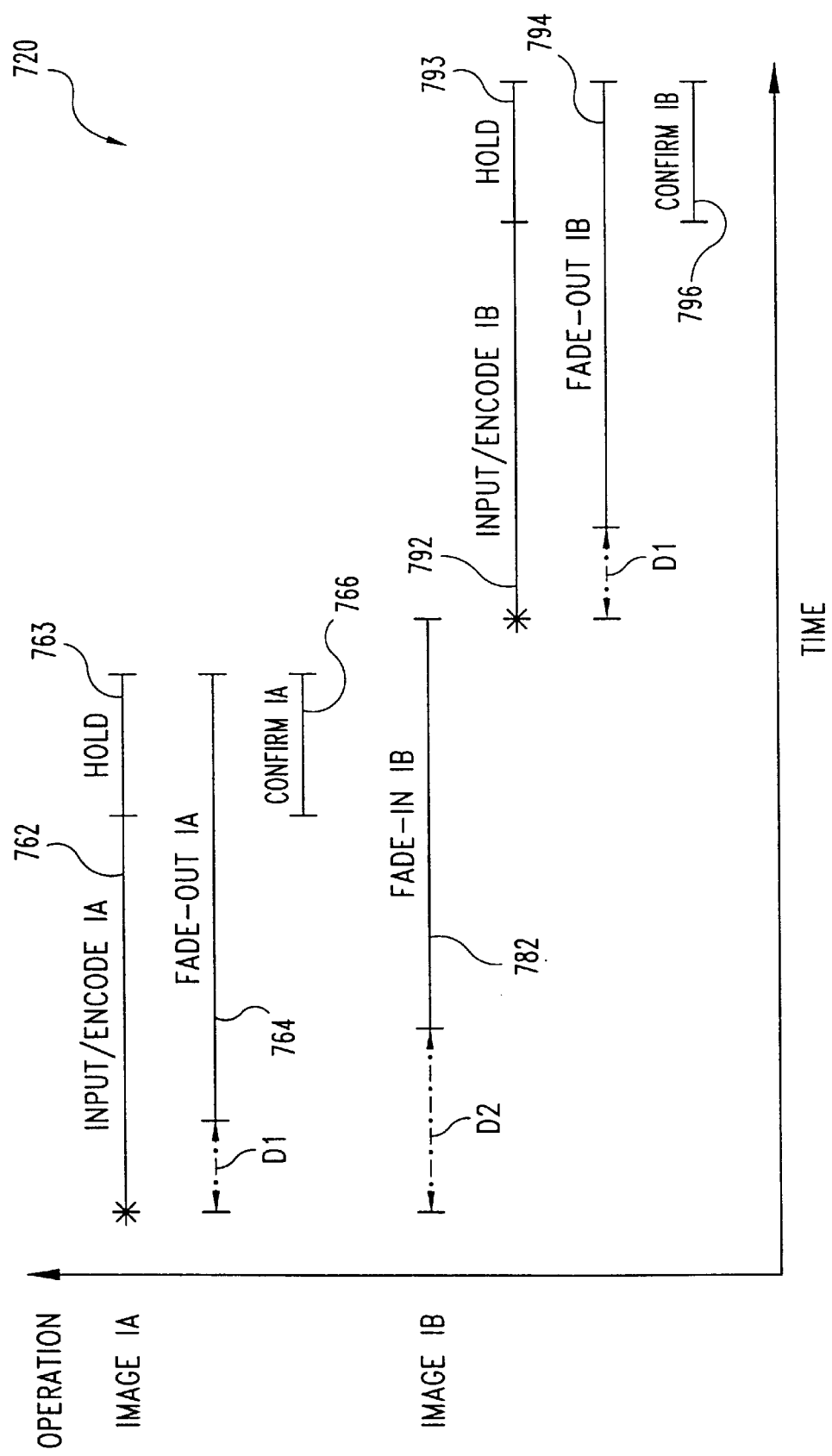
FIG. 14 is a timing diagram illustrating one mode of timing images in accordance with the routine depicted by the flow chart of FIG. 10.

Returning to FIG. 10, stage 664 follows stage 662. In stage 664, a fade-out of the image over time is triggered. In one embodiment, the fading out of the image begins relative to the start time for the performance of stage 662. In other words, stage 664 is executed in response to the initiation of stage 662. Referring also to FIG. 14, timing pattern 720 illustrates one example of this timing relationship. For timing pattern 720, stage 662 occurs over input/encode time period 762 and stage 664 occurs during fade-out time interval 764 for image IA. The start time of input/encode time period 762 is indicated by an asterisk ("*") at the left-most end of the representative line segment for this time period. Fade-out time interval 764 is preceded by delay D1 indicated in broken line form relative to the start time. Delay D1 represents the amount of time, if any, from the start time of input/encode time period 762 to the initiation of fade-out of the image over fade-out time interval 764. In one example, delay D1 is of a duration sufficient to be perceptible to the operator. In another example, delay D1 is of a relatively shorter duration such that it is generally imperceptible to the operator. In still another example, delay D1 is essentially zero with fade-out time interval 764 starting at approximately the same time as input/encode time period 762.

Turning to stage 666 of routine 650 as illustrated in FIG. 10, confirmation of the operator input is provided. Typically, confirmation includes displaying the character representation determined with one or more voice recognition vocabularies during stage 662. One example of a displayed confirmation of a postal code address type is depicted as confirmation field 566 in FIG. 13. For this example, the confirmation text can be of a large, prominent type size and presented in a contrasting color relative to image field 506 and/or locator 510. Moreover, confirmation field 566 may be fixed in one location on display 594 or its position varied, depending on the location/size of the image presented in image field 506. Alternatively or additionally, one or more different outputs may be provided to the operator as confirmation of the input provided in stage 662.

In FIG. 10, conditional 670 is encountered after stage 666 to test whether the operator desires to recall the image as it fades out. For timing pattern 720 of FIG. 14, hold period 763 is illustrated immediately after input/encode time period 762 during which the operator can recall the image as it fades out over fade-out time interval 764. Recall can be accomplished with one or more inputs with I/O devices 591. If the image is recalled (the test for conditional 670 is affirmative), restoration occurs in stage 672 and control returns to stage 652 via input loop 660. Relative to hold period 763, timing pattern 720 also depicts one non-limiting example of the timing for the confirmation of stage 666. In this example, confirmation is presented on display 594 over time interval 766. Time interval 766 generally starts at the same time as hold period 763 after image IA has begun to fade-out and also terminates with hold period 763. In other embodiments, confirmation may be timed differently. For example, time interval 766 may occur before or after the initiation of hold period 763. Alternatively or additionally, confirmation may be provided relative to a condition/degree of fade-out of the image from the display.

If the image is not recalled by the operator during hold period 763 (the test of conditional 670 is negative), then conditional 680 is encountered. Conditional 680 tests whether the last image has been processed. If there are additional images to process, the next image is presented in stage 682, and control returns to stage 652 of image preparation branch 658 via loop 690. For stage 682, the next image is faded-in while the current image is being faded-out. Images IA and IB of FIGS. 13–14 are illustrative of selected relationships between the current image and next image, respectively.

Figure 13:
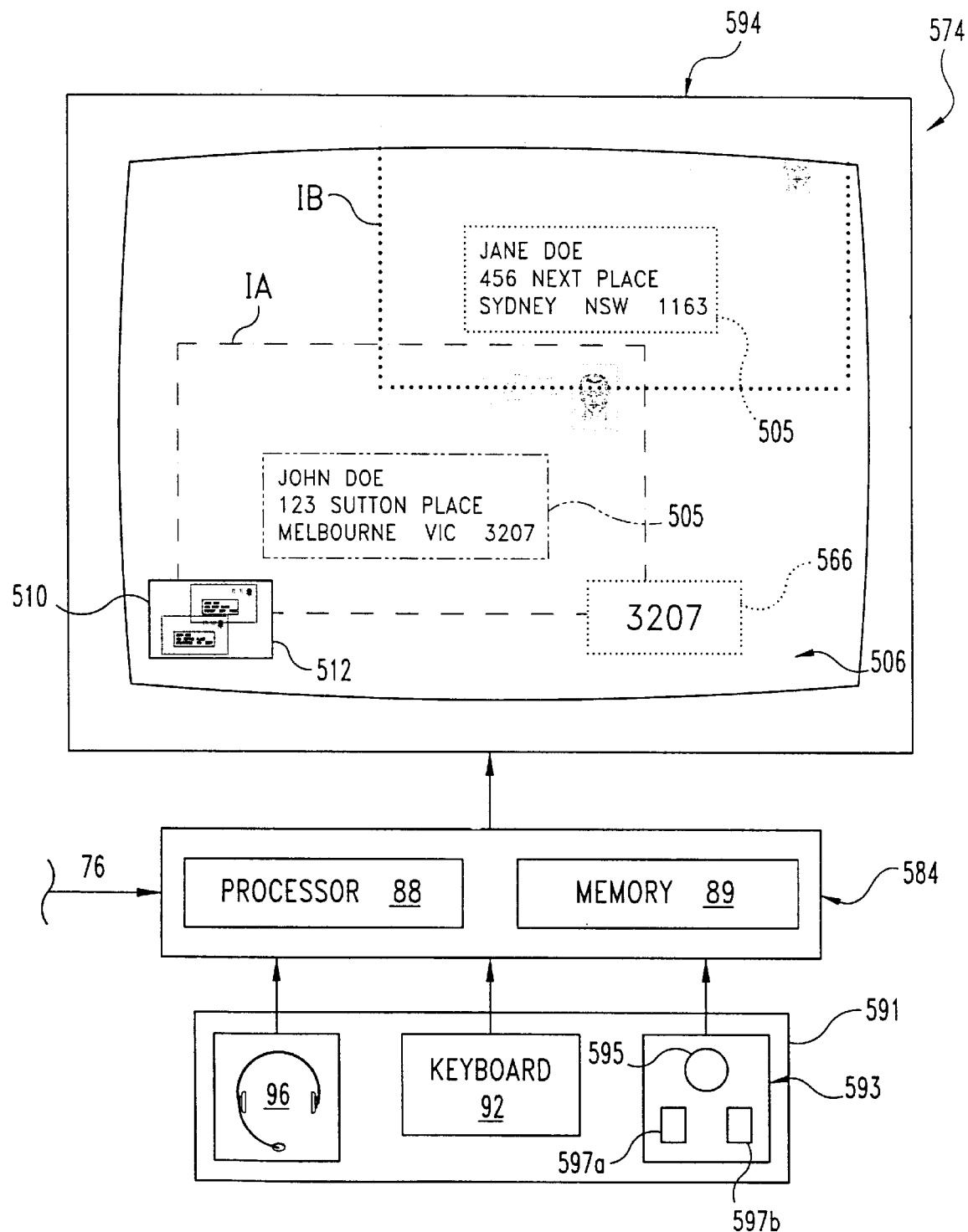

In FIG. 13, images IA and IB overlap while image IA fades-out and image IB fades-in as schematically represented by different line weighting and patterns. Correspondingly, in FIG. 14, fade-in time interval 782 for image IB overlaps fade-out time interval 764 for image IA. Like fade-out time interval 764, fade-in time interval 782 is initiated relative to the start time for input/encode time period 762. For the illustrated example, presentation of image IB is begun after delay D2 determined relative to the start time; where delay D2 is shown in broken line form. As in the case of delay D1, delay D2 can be of sufficient duration to be perceived by an operator, or of such a brief nature as to be imperceptible or essentially non-existent. In one alternative embodiment, fade-out time interval 764 and fade-in time interval 782 can vary relative to each other and the start time as would occur to those skilled in the art. In yet another embodiment, time intervals 764, 782 are essentially the same, with both starting at about the same time relative to the start time for input/encode time period 762 and both being of about the same duration. In a further embodiment, both time intervals 764, 782 are of essentially the same duration and began immediately after the start of input/encode time period 762. In still other alternatives, only one or neither of time intervals 764, 782 is determined relative to the start time and may be otherwise determined as would occur to those skilled in the art.

Timing pattern 720 further illustrates input/encode time period 792 for image IB with its start time indicated by an asterisk ("*"). Hold period 793 is illustrated immediately after time period 792. Fade-out time interval 794 and confirmation period 796 are also illustrated; where these features correspond to like named features described for timing pattern 720 in connection with image IA. Delay D1 is also illustrated before fade-out time interval 794.

It should be understood that input/encode time period 762, 792 can vary with the nature of the vocal input, processing load, and other factors. Nonetheless, a maximum extreme period could be selected to provide for a uniform time period used to input and encode operator information for each image. The duration and initiation of hold periods 763, 793; delays D1, D2; fade-out time intervals 764, 794; and fade-in time interval 782 can vary for processing of one image to the next like the input/encode time period; however, these durations are typically predetermined. In one embodiment, one or more of these duration types may be the same from one image to the next. Furthermore, one or more of such durations may be established specific to a given operator and maintained in an operator profile that is referenced when that operator logs in. In still another embodiment, one or more of these durations may be dynamically adjustable over time to urge faster processing by the operator as the operator's experience increases.

In one embodiment utilizing a graphic, multi-pixel type of display 594, image fade-in or fade-out includes gradually presenting or removing a number of pixels comprising the image over the corresponding fade-in or fade-out time interval. During fade-in or fade-out, the spatial distribution of the image pixels being added or removed at a given time is controlled to gradually increase or decrease overall image visibility. Accordingly, images like images IA, IB; appear to "pass-through" each other as image IA becomes less visually intense and image IB becomes more visually intense. By gradually changing the image intensity over an appropriate time interval, it has been found that the operator can more readily perceive the address block of the next image as it gradually comes into view while not losing concentration on the current image as it fades-out in case of a need for a recall. In contrast, changes to the image that are perceived by an operator to be instantaneous can cause the operator's concentration on the image address block or other relevant portion to be momentarily lost, potentially resulting in slower processing. Nonetheless, in other embodiments, a different fade-in and/or fade-out scheme may be utilized either with a multi-pixel form of display 594 or for a different display type and/or format. In yet other alternatives, only a fade-in or fade-out approach is utilized for the presentation or removal, respectively, of the images;

with the other being generally instantaneous from the operator's perspective. In fact, in one alternative, fading is not utilized at all. In other alternatives, some or all input may be provided by other than vocal means, such as keyboard 92.

Many other embodiments of the present invention are envisioned. In one embodiment, processor 64 of mail sorter 22 adjusts the rate at which mail pieces are processed in accordance with the number of mail pieces that are determined to be unsortable by the optical character reading/recognition routine. In another embodiment, mail sorter 22 and subsystem 24 are integrally combined in a single unit with a single operator input station. For such an arrangement, processor 64 may be arranged to include the operations performed with image management device 72, one or more of operator input stations 74, 574 or a combination of these. Indeed, in one embodiment, operator input device 68 includes a voice input device and processor 64 is arranged to perform voice processing in accordance with one or more of the routines, procedures, processes, or operations previously described for operator input stations 74, 574 using display 66 in place of device 94, 594.

In still other embodiments, a dedicated image management device 72 may not be necessary, instead being performed by processor 88 of one or more operator input stations 74, 574. In still a further embodiment, one or more of operator input stations 74, 574 are remotely located relative to image management device 72, and may in fact be arranged to facilitate work by one or more operators from home using the internet as network 76 or network 26 to interface with the rest of system 20.

Besides the utilization of a common operator input processing subsystem 24 to accommodate more than one sorter such as illustrated in FIG. 2, multiple operator entry subsystems may also be utilized. In one alternative embodiment, a number of mail sorters and a number of operator entry subsystems are remotely located with respect to one another and coupled by a common network with means to route and balance operator input image processing amongst available operator input stations in accordance with demand provided by one or more of the mail sorters. For this embodiment, the increased processing capabilities can better distribute peak operator input processing loads for a given sorter.

A further embodiment includes operating a mail sorting system to sort a plurality of mail pieces and imaging each of the mail pieces during this operation. An image is displayed of one of the mail pieces that includes address information and the address information is entered into the system with a voice input device in response to its display. The mail piece corresponding to the entered address information is sorted in accordance with this information.

In another embodiment, a first vocal input is provided to a mail processing system. A first character representation is determined with the system in response to the first vocal input. The first character representation corresponds to a first part of an address of a mail piece being processed by the system. A number of options are established with the system for a second character representation corresponding to a second part of the address. These options are determined in accordance with the relationship between the first part and the second part of the address. One of the options is selected for the second character representation in accordance with the second vocal input to the system.

Still another embodiment includes an operator display device operable to receive an image of at least a portion of an address of a mail piece and present the image for viewing by an operator. A voice input device is also included to provide one or more voice inputs representative of address information determined from the image by the operator. A processor is further included that responds to the one or more voice inputs to generate an output signal to direct processing of the mail piece.

Yet another alternative embodiment includes a computer readable apparatus encoded with programming instructions for a voice processing routine to identify address information for a mail processing system. The instructions are executable to generate a first character output in response to a first vocal input to the system that corresponds to a first part of an address of a mail piece. Also generated are a number of options for a character representation corresponding to a second part of the address in accordance with a relationship between the first part of the address and the second part of the address. A second character output corresponding to the second part of the address is selected from the options in response to a second vocal input.

A still further embodiment includes processing each of a plurality of mail pieces with at least one character recognition routine performed with a mail sorter to sort a first number of mail pieces. A second number of mail pieces are determined to be unsortable by this routine. An image is sent for each of the second number of mail pieces to a group of operator input stations. The image for a respective one of the second number of mail pieces is displayed on a display of one of the operator input stations and sorting information is entered for this respective one of the second number of mail pieces with a voice input device.

A different embodiment includes presenting a first mail piece image to an operator on a display device and entering address information from the first mail piece image into a processing system with a voice input device. The second mail piece image is displayed on the display device in response to the initiation of this entry.

In a further embodiment, a mail piece image is present to an operator on a display device and address information is entered from the mail piece image into a processing system with a voice input device. Removal of the mail piece image from the display device is initiated relative to a start time for this entry.

In yet a further embodiment, an apparatus is encoded with programming for a processor to process a number of mail piece images with a display device in response to one or more inputs with a voice input device. This apparatus comprises a number of program instructions executable by the processor to display a first one of the mail piece images on the display device. Removal of the first one of the images is initiated relative to a start time for entry of address information with the voice input device determined from this first image. A second one of the mail images is displayed on the display device also relative to this start time.

As used herein, it should be appreciated that: variable, criterion, characteristic, comparison, quantity, amount, information, value, level, term, constant, flag, data, record, threshold, limit, input, output, pixel, image (or a region thereof), matrix, command, look-up table, profile, schedule, or memory location each generally correspond to one or more signals within processing equipment of the present invention. Also, it is contemplated that various operations, stages, conditionals, procedures, thresholds, routines, and processes described in connection with the present invention could be altered, rearranged, substituted, deleted, duplicated, combined, or added as would occur to those skilled in the art.

All publications, patents, and patent applications cited in this specification are herein incorporated by reference as if each individual publication, patent, or patent application was specifically and individually indicated to be incorporated by reference and set forth in its entirety herein. Furthermore, it is not intended that the present invention be limited to any theory, mechanism, finding, or observation expressed herein. While the invention has been illustrated and described in detail in the drawings and foregoing description, the same is considered to be illustrative and not restrictive in character, it is understood that only the preferred embodiments have been shown and described and that all changes, modifications and equivalents that come within the spirit of the invention as defined by the following claims are desired to be protected.

What is claimed is:

1. A method, comprising:

processing each of a plurality of mail pieces with at least one character recognition routine performed with a mail sorter to sort a first number of the mail pieces;

determining a second number of the mail pieces are unsortable by said processing;

sending a number of images to a group of operator input stations, the images each corresponding to one of the second number of the mail pieces;

displaying a first one of the images on a display device for a first one of the operator input stations;

routing the second number of mailpieces to a delay queue while the first one of the images is displayed on the display device;

entering address information from the first one of the images with a voice input device for the first one of the operator input stations wherein said entering includes speaking at least one character of at least one of a postal code, locality designation, a house designation, an apartment designation, a suite designation, a floor designation, a post office box designation and a street designation and wherein the address information entered from the first one of the images includes a first address part;

displaying the first one of the images on a display device for a second one of the operator input stations; and entering a second address part with a voice input device for the second one of the operator input stations.

2. The method of claim 1, wherein the first address part is at least a portion of a postal code and the second address part is at least one of a locality designation, a house designation, an apartment designation, a suite designation, a floor designation, a post office box designation, and a street designation.

3. The method of claim 2, further comprising moving the one of the mail pieces to a re-sort bin.

4. The method of claim 3, further comprising:

fading-in a second one of the images on the display device in response to initiation of said entering;

providing a vocal input to enter at least part of an address determined from the second one of the images with the voice input device;

wherein said displaying, said entering, said fading-in, and said providing are performed at a location remote from the mail pieces; and the first one of the images fades-out in response to initiation of said entering.

* * * * *